(12) United States Patent
Cobb et al.

(10) Patent No.: US 8,746,463 B2
(45) Date of Patent: Jun. 10, 2014

(54) APPARATUS FOR SEPARATING PARTICULATE FROM STORMWATER

(75) Inventors: Daniel P. Cobb, Portland, ME (US); Christopher S. Hersey, South Portland, ME (US); John E. Richardson, Blue Hill, ME (US)

(73) Assignee: Contech Engineered Solutions LLC, West Chester, OH (US)

( * ) Notice: Subject to any disclaimer, the term of this patent is extended or adjusted under 35 U.S.C. 154(b) by 1762 days.

(21) Appl. No.: 11/751,209

(22) Filed: May 21, 2007

(65) Prior Publication Data

US 2007/0267342 A1    Nov. 22, 2007

Related U.S. Application Data

(60) Provisional application No. 60/802,348, filed on May 22, 2006.

(51) Int. Cl.
*B01D 21/26* (2006.01)
*B01D 21/24* (2006.01)
*C02F 1/38* (2006.01)

(52) U.S. Cl.
USPC .............. 210/512.1; 210/519; 210/532.1; 210/170.03; 210/304; 210/305

(58) Field of Classification Search
USPC ............ 210/512.1, 787–788, 170.03, 170.07, 210/170.08, 800–802, 532.1, 538, 521, 540, 210/519, 305, 539, 304
See application file for complete search history.

(56) References Cited

U.S. PATENT DOCUMENTS

| | | | |
|---|---|---|---|
| 2,717,695 A | * | 9/1955 | Martin .................. 209/732 |
| 4,201,101 A | | 5/1980 | Gerber |
| 4,379,416 A | | 4/1983 | Kuchler |
| 4,510,056 A | | 4/1985 | Frykhult et al. |
| 4,517,091 A | | 5/1985 | Yamanaka et al. |
| 4,571,301 A | | 2/1986 | Inskeep, Jr. |
| 4,597,871 A | | 7/1986 | Okouchi et al. |

(Continued)

FOREIGN PATENT DOCUMENTS

| AU | 2006202600 | 1/2007 |
|---|---|---|
| DE | 2164828 | 6/1973 |

(Continued)

OTHER PUBLICATIONS

Andoh, Robert; "*CFD Saves $50,000 in Design of Stormwater Separator*"; Hydro International, Portland, Maine, USA, Summer-2006; p. 35-37.

(Continued)

*Primary Examiner* — David C Mellon
(74) *Attorney, Agent, or Firm* — Thompson Hine LLP

(57) ABSTRACT

A liquid separation system and related method for retaining floating and non-floating particulates within a storage chamber of a treatment tank. The tank may or may not include a bypass to allow a portion of liquid coming into the tank to bypass the storage chamber. The storage chamber includes an inlet and an outlet. The outlet may be positioned within the storage chamber to cause minimal disruption of the primary and secondary liquid flow patterns within the storage chamber. A circular or rotational flow pattern may be created within the storage chamber and an outlet port of the storage chamber may be centered on an axis of the circular flow pattern.

21 Claims, 18 Drawing Sheets

(56) References Cited

U.S. PATENT DOCUMENTS

| | | | |
|---|---|---|---|
| 4,696,737 A | 9/1987 | Bouchillon |
| 4,737,271 A | 4/1988 | Childs |
| 4,747,962 A | 5/1988 | Smisson |
| 4,786,412 A | 11/1988 | Lister et al. |
| 4,793,925 A | 12/1988 | Duvall et al. |
| 4,801,310 A | 1/1989 | Bielefeldt |
| 4,865,751 A | 9/1989 | Smisson |
| 4,985,148 A | 1/1991 | Monteith |
| 5,002,671 A | 3/1991 | de Villiers et al. |
| 5,024,755 A | 6/1991 | Livsey |
| 5,116,488 A | 5/1992 | Torregrossa |
| 5,116,516 A | 5/1992 | Smisson |
| 5,132,024 A | 7/1992 | Hulbert |
| 5,139,652 A | 8/1992 | LeBlanc |
| 5,188,238 A | 2/1993 | Smisson et al. |
| 5,266,198 A | 11/1993 | Vikiö |
| 5,269,949 A | 12/1993 | Tuszko et al. |
| 5,391,294 A | 2/1995 | Mercier |
| 5,453,196 A | 9/1995 | Tuszko et al. |
| 5,498,331 A | 3/1996 | Monteith |
| 5,651,466 A | 7/1997 | Satomi |
| 5,666,866 A | 9/1997 | Huang et al. |
| 5,725,760 A | 3/1998 | Monteith |
| 5,746,912 A | 5/1998 | Monteith |
| 5,753,115 A | 5/1998 | Monteith |
| 5,759,415 A | 6/1998 | Adams |
| 5,849,181 A | 12/1998 | Monteith |
| 5,882,530 A | 3/1999 | Chase |
| 5,900,149 A | 5/1999 | Bradford |
| 5,972,229 A | 10/1999 | Lundin |
| 6,024,874 A | 2/2000 | Lott |
| 6,062,767 A | 5/2000 | Kizhnerman et al. |
| 6,068,765 A | 5/2000 | Monteith |
| 6,071,424 A | 6/2000 | Tuszko et al. |
| 6,117,340 A | 9/2000 | Carstens |
| 6,120,684 A | 9/2000 | Kistner et al. |
| 6,168,716 B1 | 1/2001 | Conrad et al. |
| 6,210,575 B1 | 4/2001 | Chase et al. |
| 6,228,260 B1 | 5/2001 | Conrad et al. |
| 6,241,881 B1 | 6/2001 | Pezzaniti |
| 6,251,296 B1 | 6/2001 | Conrad et al. |
| 6,277,278 B1 | 8/2001 | Conrad et al. |
| 6,337,016 B1 | 1/2002 | Alper |
| 6,350,374 B1 | 2/2002 | Stever et al. |
| 6,371,690 B1 | 4/2002 | Monteith |
| 6,398,969 B1 | 6/2002 | Hartmann |
| 6,524,473 B2 | 2/2003 | Williamson |
| 6,540,918 B2 | 4/2003 | Gil et al. |
| 6,547,962 B2 | 4/2003 | Kistner et al. |
| 6,596,169 B1 | 7/2003 | Rong et al. |
| 6,596,170 B2 | 7/2003 | Tuszko et al. |
| 6,730,222 B1 | 5/2004 | Andoh et al. |
| 6,767,459 B1 | 7/2004 | Sinker et al. |
| 6,793,814 B2 | 9/2004 | Fout et al. |
| 6,811,699 B2 | 11/2004 | Arnaud |
| 6,811,713 B2 | 11/2004 | Arnaud |
| 6,849,182 B2 | 2/2005 | Redding |
| 6,913,155 B2 | 7/2005 | Bryant |
| 6,919,033 B2 | 7/2005 | Stark et al. |
| 6,926,749 B1 | 8/2005 | Tenney |
| 6,951,619 B2 | 10/2005 | Bryant |
| 6,983,850 B2 | 1/2006 | Olson et al. |
| 7,022,243 B2 | 4/2006 | Bryant |
| 7,025,890 B2 | 4/2006 | Moya |
| 7,182,874 B2 * | 2/2007 | Allard et al. ............... 210/788 |
| 2003/0116506 A1 | 6/2003 | Lane |
| 2004/0069705 A1 | 4/2004 | Tuszko et al. |
| 2004/0084385 A1 | 5/2004 | Arnaud |
| 2004/0099615 A1 | 5/2004 | Arnaud |
| 2004/0099616 A1 | 5/2004 | Arnaud |
| 2004/0149667 A1 | 8/2004 | Meyer |
| 2005/0040027 A1 | 2/2005 | Fout et al. |
| 2005/0056587 A1 | 3/2005 | Allen, II et al. |
| 2005/0077248 A1 | 4/2005 | Stark et al. |
| 2005/0087502 A1 | 4/2005 | Meyermann |
| 2005/0145562 A1 | 7/2005 | Allen, II et al. |
| 2005/0184007 A1 | 8/2005 | Allard et al. |
| 2005/0218088 A1 | 10/2005 | Gonzalex et al. |
| 2006/0043010 A1 | 3/2006 | Faram et al. |
| 2006/0272998 A1 * | 12/2006 | Janson .................. 210/321.61 |
| 2006/0283814 A1 | 12/2006 | Williamson et al. |
| 2007/0012608 A1 | 1/2007 | Su et al. |
| 2007/0108122 A1 | 5/2007 | Andoh et al. |

FOREIGN PATENT DOCUMENTS

| | | |
|---|---|---|
| DE | 20309394 U1 | 11/2003 |
| EP | 0363050 | 4/1990 |
| EP | 0574649 A1 | 6/1992 |
| EP | 1136201 A2 | 2/2001 |
| GB | 2167689 A | 6/1986 |
| GB | 2403170 | 12/2004 |
| KR | 100464640 B | 12/2004 |
| KR | 100479717 B1 | 3/2005 |
| WO | WO 89/07971 | 8/1989 |
| WO | WO 00-66333 | 11/2000 |

OTHER PUBLICATIONS

International Search Report, PCT/US2007/069322, filed May 21, 2007.

Written Opinion of the International Search Authority, PCT/US2007/069322, filed May 21, 2007.

PCT, International Preliminary Report on Patentability, PCT/US2007/069322 (Nov. 27, 2008).

* cited by examiner

APPARATUS FOR SEPARATING PARTICULATE FROM STORMWATER

CROSS-REFERENCES

This application claims the benefit of U.S. provisional application Ser. No. 60/802,348, filed May 22, 2006, the entirety of which is incorporated herein by reference.

TECHNICAL FIELD

The present application relates to systems for separating particulate from liquids, particularly drain water and stormwater runoff.

BACKGROUND

Liquid transfer systems have been and will remain an important aspect of municipal services and commercial facilities management. The protection of ground water and natural bodies of water requires systems for diverting and/or treating water that contacts roadways, parking lots, and other man made structures. If such diversion or treatment systems are not provided, particulate and contaminants located on or forming part of such structures may be carried by drain water or stormwater to natural water bodies and contaminate them. Local, state and federal laws and rules require municipalities, businesses and, in some instances, private entities, to establish means to reduce particulate and contaminant levels permissibly transferred to natural bodies of water from property under their control. Particular requirements may vary from jurisdiction to jurisdiction, but all are likely to become more, rather than less, stringent.

Previously, municipal water transfer and treatment facilities provided the only mechanism for diverting contaminated water away from natural bodies of water, either for holding or treatment for subsequent transfer to natural settings. In general, that process involved, and continues to involve, the establishment of a system of drains, such as in a parking lot or at a street curb, by which water enters a system of pipe conduits. Eventually, the water received from the drains reaches either a final outlet destination or is directed to a treatment system for contaminant removal. For purposes of this application, "contaminated water" is to be understood to mean any water including floating particulate, such as closed-cell extruded polystyrene foam and oil, for example; non-floating particulate, such as sand and silt, for example; and entrained contaminants, such as dissolved nutrients or metals, for example. All of these undesired materials will be, in most instances, referred to herein generally as contaminants. As used herein the term "particulate" is to be understood to include floating particulate and/or non-floating particulate.

Land development produces increased levels of drain water and stormwater runoff, resulting in increased strain on existing water transfer and treatment infrastructure and an increased likelihood of natural water contamination. In an effort to reduce the impact of development on natural resources and municipal services, initial upstream treatment has become a requirement in many land development, restoration and repair projects. That is, requirements in various forms have been established to ensure that before contaminated water enters the municipal water transfer and/or treatment system or natural receiving waters, it must be treated in a manner that reduces the level of contaminants entering the municipal system or natural receiving waters. Therefore, most new land development plans and upgrades to existing paved surfaces involve the insertion of a preliminary separation system, generally for connection to the municipal water-handling infrastructure.

Any preliminary separation system should be designed with the capability to receive liquid flowing in at a wide range of rates. For example, a mild rainfall resulting in rain accumulation of less than 0.25 inches over a span of 24 hours produces a relatively low flow rate through the system. On the other hand, for example, a torrential rainfall resulting in rain accumulation of more than two inches over a span of three hours produces relatively high flow rates through the system. It is desirable, then, to have a separation system capable of handling variable flow rates with reduced likelihood of backup and flooding of the surface above. It is also desirable to control the flow through the system such that scouring or wash out of previously trapped particulates during high flows is reduced.

A variety of stormwater separation systems exist. These systems may be characterized generally as a tank or container including a storage or treatment chamber within which, ideally, floating particulates are retained, and non-floating particulates are allowed to settle. The storage chamber includes an inlet for receiving untreated water, and an outlet for movement of treated water out of the chamber. The tank may also include a bypass arrangement to allow excess untreated water to exit the tank without passing through the storage chamber. In many cases, the storage chamber is arranged with the inlet and outlet located at the chamber perimeter. Often, the inlet and outlet are spaced away from each other, but in some cases may be arranged near each other.

Advancements in manufacturability, cost and effectiveness of separation systems continue to be sought.

SUMMARY

In one aspect, a separation system for separating particulate from liquid includes a tank including an inlet for receiving liquid therein and an outlet for transferring liquid out of the tank. A storage chamber forms part of the tank, the storage chamber including a bottom and interior sidewalls, an inlet and an outlet. A bypass extends through the tank, wherein the bypass is arranged to receive liquid from the tank inlet, to transfer liquid into the storage chamber via the storage chamber inlet and to receive liquid from the storage chamber via the storage chamber outlet. A weir is positioned to direct liquid from the tank inlet to the storage chamber under relatively low flows and under relatively high flows to divert one portion of liquid from the tank inlet to the storage chamber and to allow another portion of liquid to flow directly through the bypass from the tank inlet to the tank outlet without entering the storage chamber. Liquid entering the storage chamber is directed to produce a rotational liquid flow, as viewed from the top, within the storage chamber, and a storage chamber outlet port is located substantially centrally relative to a vertical axis of the rotational liquid flow and at an elevation that is at or below a no flow liquid level elevation of the storage chamber. Flow in a region of the storage chamber below the storage chamber outlet port is substantially unobstructed.

In another aspect, a separation system for separating particulate from liquid includes a tank including an inlet for receiving liquid therein and an outlet for transferring liquid out of the tank. A storage chamber forms part of the tank. Water entering the tank is directed to produce a rotational liquid flow, as viewed from the top, within the storage chamber, and a storage chamber outlet port for a flow path leading from the storage chamber to the tank outlet is located substantially centrally relative to a vertical axis of the rotational liquid flow and at an elevation that is at or below a no flow liquid level elevation of the storage chamber. Flow into the storage chamber outlet port is in an upward direction.

In a further aspect, a separation system for separating particulate from a liquid includes a tank including an inlet for receiving the liquid therein and an outlet for transferring the liquid out of the tank. A storage chamber forms part of the tank, the storage chamber including a bottom and interior sidewalls, an inlet and an outlet, wherein the storage chamber outlet is positioned within the storage chamber to cause minimal disruption of the liquid flow pattern and where turbulence within the storage chamber is minimized. A bypass extends through the tank, wherein the bypass is arranged to receive the liquid from the tank inlet, to transfer the liquid into the storage chamber inlet and to receive the liquid from the storage chamber outlet. A weir is positioned in the bypass between the storage chamber inlet and the storage chamber outlet, wherein the weir is configured to divert liquid from the tank inlet to the storage chamber under relatively low liquid flows and under relatively high liquid flows to divert one portion of the liquid from the tank inlet to the storage chamber and to allow the remaining portion of the liquid to flow directly through the bypass from the tank inlet to the tank outlet.

In still another aspect, a separation system for separating particulate from a liquid includes a tank including an inlet for receiving the liquid therein and an outlet for transferring the liquid out of the tank. A storage chamber forms part of the tank, the storage chamber including a bottom and interior sidewalls, an inlet and an outlet, wherein the storage chamber outlet is positioned within the storage chamber to cause minimal disruption of the liquid flow pattern and where turbulence within the storage chamber is minimized.

In a further aspect, a method for separating particulate from stormwater involves the steps of directing water entering a storage chamber so as to create a rotational flow pattern, as viewed from the top, within the storage chamber; separating at least a portion of the floating and non-floating particulates from the water within the storage chamber; positioning an outlet port of the storage chamber at a location substantially centered relative to a vertical axis of the rotational liquid flow and at an elevation that is at or below a no flow liquid level elevation of the storage chamber; and providing substantially unobstructed flow in a region of the storage chamber below the outlet port.

DETAILED DESCRIPTION

Figure 1:
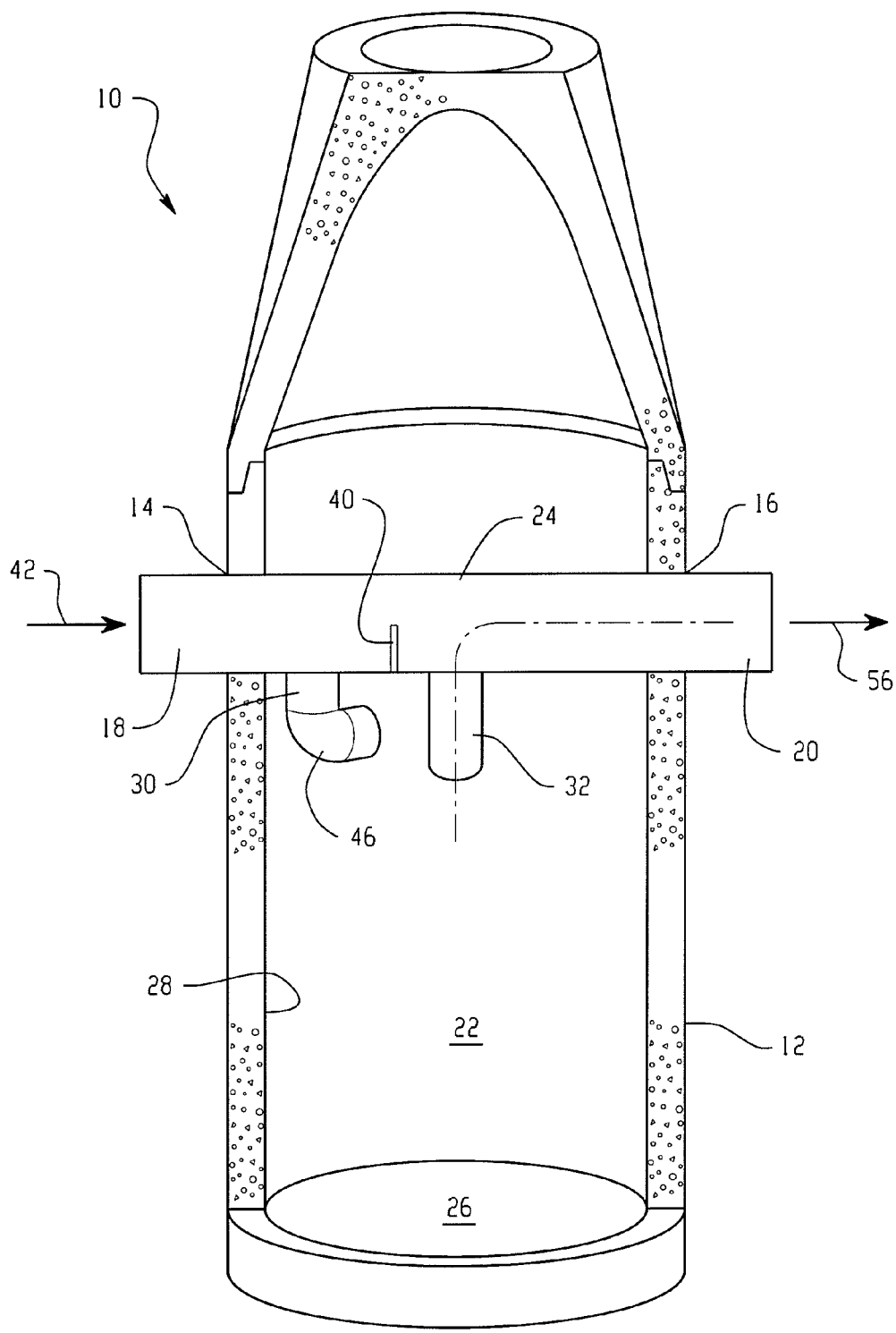
FIG. 1 is a cross-sectional side view of a first embodiment of the separation system of the present invention showing the bypass, the storage chamber inlet piping and the storage chamber outlet pipe.
Figure 2:
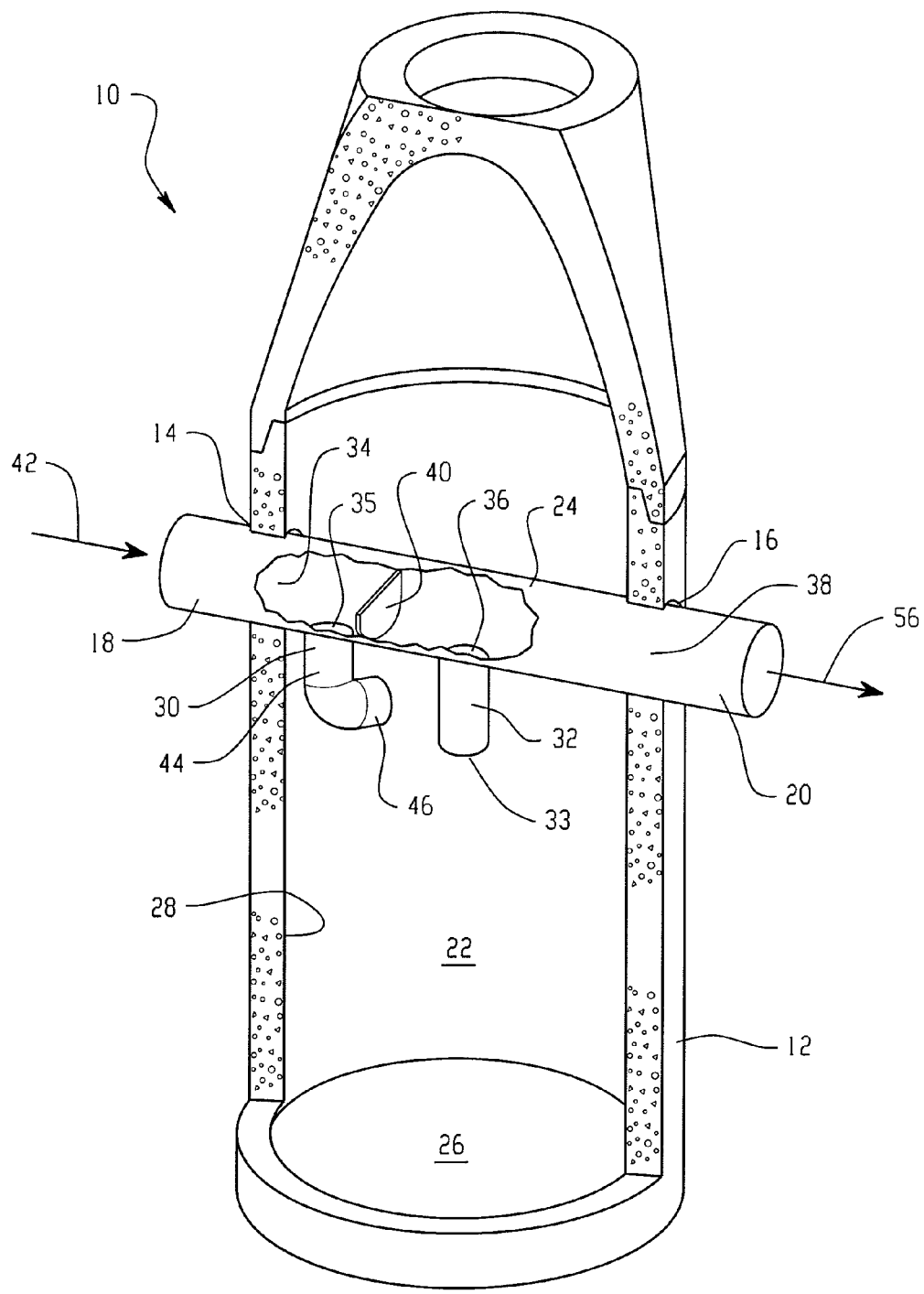
FIG. 2 is a cross-sectional perspective view of the separation system of FIG. 1 also showing a partial cutaway view of the bypass.
Figure 3:
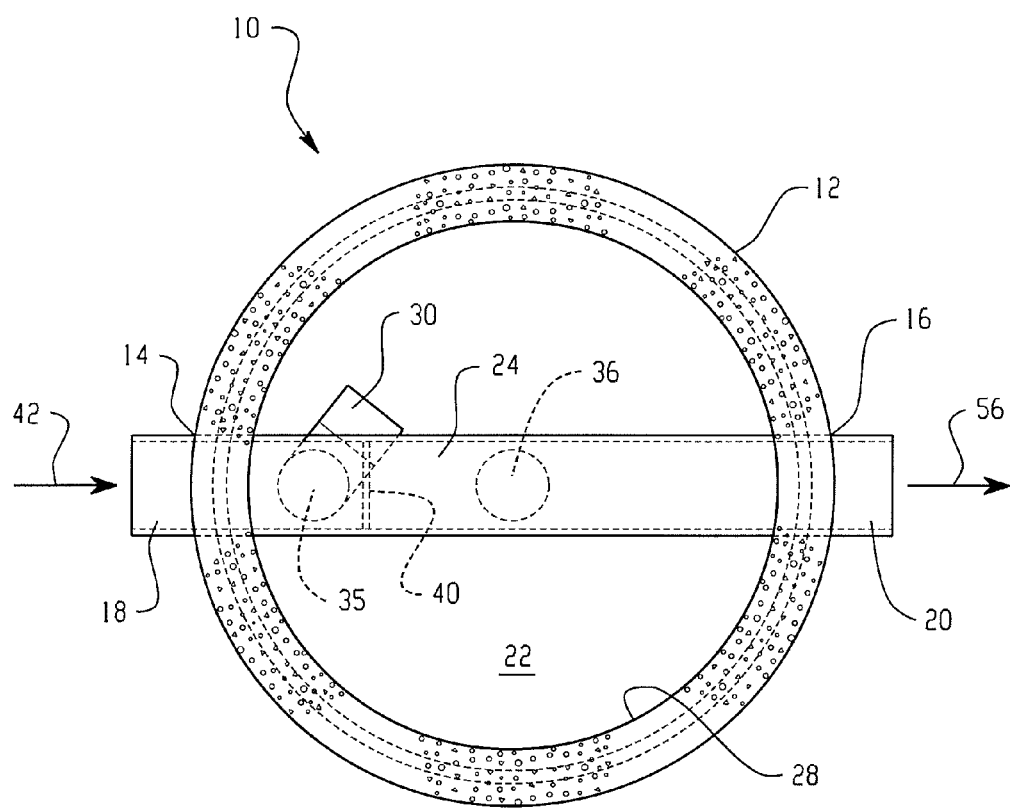
FIG. 3 is a cutaway top view of the tank of the separation system of FIG. 1.

A first embodiment of a separation system 10 is illustrated in FIGS. 1-4. As illustrated in FIGS. 1-3, the system 10 includes a tank 12 having a tank inlet 14 and a tank outlet 16. The tank 12 is preferably made of concrete but may alternatively be fabricated in whole or in parts of metal, plastic, such as fiberglass, or other suitable materials or a combination thereof. It may be fabricated of an existing manhole or manhole design and modified in the manner to be described herein. The tank inlet 14 may be used to receive untreated liquid from a source. The source may be an upstream transfer system joined to the tank inlet 14 by an upstream conduit 18. Alternatively, the tank inlet 14 may receive the untreated liquid directly, such as from a storm drain. For example, the upstream transfer system may include a drainage system from a roadway or a parking lot. Similarly, the tank outlet 16 may be used to transfer treated (and untreated) liquid to a receiver. The receiver may be a downstream transfer system joined to the tank outlet 16 by a downstream conduit 20. The downstream liquid transfer system may include a multi-user water treatment plant, natural or artificial surface waters, or subsurface containment.

The tank 12 includes a storage chamber 22 and a bypass 24. The storage chamber 22 is generally shaped to produce or otherwise allow the rotational movement of liquid therein. Although not specifically limited thereto, the storage chamber 22 is preferably cylindrical in shape. The tank 12 may or may not be of the same shape. The illustrated storage chamber 22 includes a bottom 26 and interior sidewalls 28 in a cylindrical form but may alternatively be in a polygonal form. The storage chamber 22 further includes an inlet 30 and an outlet 32. The tank 12 may include a lid. If the tank 12 does include a lid, the storage chamber 22 is typically the space established by the bottom 26 and interior sidewalls 28 and extends upwardly from the bottom 26 to a plane at or below the level of the lid. The tank may include an equalizing line to equalize pressure inside and outside the tank 12. The use of an equalizing line allows liquid within the tank 12 to rise to its highest level of equalization within the separation system 10 including any inlet and outlet piping. For a tank 12 including an equalizing line, the top of the storage chamber 22 is the water surface elevation in the equalizing line, which may exceed the top of the bypass 24. Alternatively, for the arrangement of the separation system 10 wherein the tank 12 has no lid, the height of the interior sidewalls 28 may be arranged to be above the highest possible water surface elevation, thereby eliminating the need for a lid while allowing the interior space of the storage chamber 22 to remain open for inspection and maintenance.

The bypass 24 includes a first inlet 34 at or near the tank inlet 14, a first outlet 35 in fluid communication with the storage chamber inlet 30, a second inlet 36 in fluid communication with the storage chamber outlet 32 and a second outlet 38 at or near the tank outlet 16. A weir 40 is positioned in the bypass between outlet 35 and inlet 36. The weir 40 diverts untreated liquid entering the bypass 24 at the first inlet 34 through the storage chamber inlet 30 into the storage chamber 22. The weir 40 is further arranged within the bypass 24 to allow excess untreated liquid to pass directly to the second outlet 38 without passing through storage chamber 22.

With continuing reference to FIGS. 1-3, the separation system 10 operates substantially as follows. Untreated liquid 42 enters the tank 12 at tank inlet 14. The untreated liquid 42 passes into the bypass 24 at first inlet 34. The untreated liquid 42 then enters the storage chamber inlet 30 at first bypass outlet 35, which is located near the first inlet 34 at or near the invert of the bypass 24. The weir 40 is positioned downstream of the storage chamber inlet 30 between the first outlet 35 and the second inlet 36 and acts to divert untreated liquid 42 into the storage chamber inlet 30 under relatively low flow rates. Under relatively high flow rates, the weir 40 diverts a portion of the untreated liquid 42 into the storage chamber inlet 30 through the first outlet 35 while the remainder of the untreated liquid 42 moves directly through the bypass 24 to the tank outlet 16. The amount of untreated liquid 42 diverted into the storage chamber inlet 30 and the amount allowed to bypass the storage chamber 22 are dependent upon the selected height of the weir 40 within the bypass 24 and the dimensions of the bypass 24.

The storage chamber inlet 30 includes a first conduit 44 and a second conduit 46. The first conduit 44 is configured to initiate passage of the untreated liquid 42 into the storage chamber 22. The second conduit 46 is in fluid communication with the first conduit 44. It is configured and arranged to divert the untreated liquid 42 into a tangential flow pattern initially along the interior sidewalls 28 of the storage chamber 22. While the storage chamber inlet 30 has been described to include the piping arrangement described and shown, it may be another configuration that initiates a flow pattern within the storage chamber 22 that applies centrifugal forces to untreated liquid components, including contaminants.

The typical assumption with the operation of any separation system designed to impart rotational movement of the liquid within a chamber has been that particles with a specific gravity greater than that of the liquid will be cast to the outer walls due to their angular velocity and the resulting centrifugal forces. Likewise, particles with a specific gravity less than that of the liquid should collect at the center. This is a good assumption, but is only partially true. The complete description of the circular or swirling flow pattern in the chamber, such as storage chamber 22, requires consideration of pressure distribution as well as the velocity profile.

Figure 4:
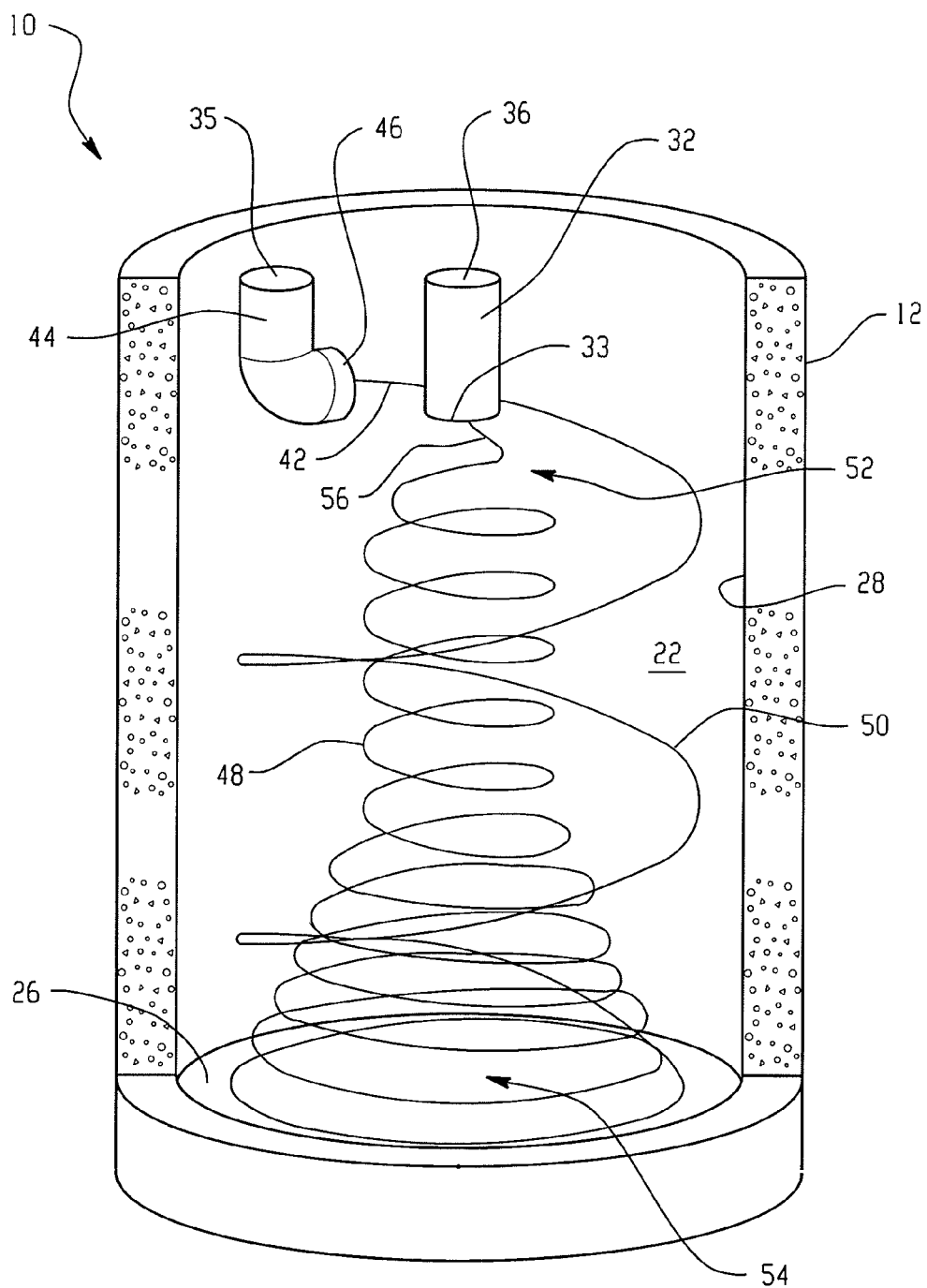
FIG. 4 is a cross-sectional side view of the storage chamber of the separation system FIG. 1 showing the liquid flow pattern within the storage chamber in the path of untreated liquid from the storage chamber inlet to treated liquid at the storage chamber outlet.
Figure 5:
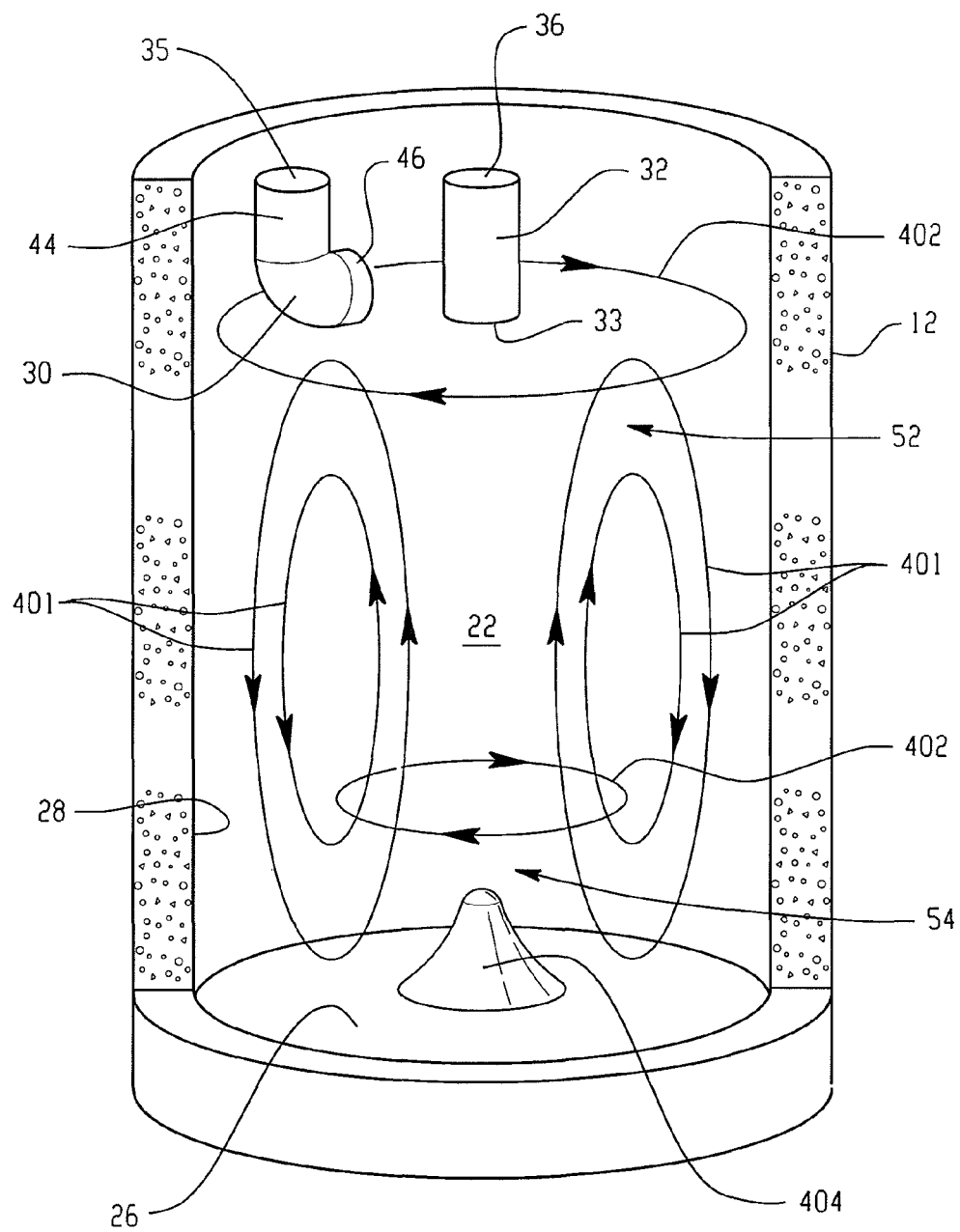
FIG. 5 is a cross-sectional side view of the storage chamber of the separation system of FIG. 1 without showing the bypass and showing the primary and secondary liquid flow patterns within the storage chamber.

With continuing reference to FIGS. 1-3 and with reference to FIGS. 4-5, the separation system 10 may take advantage of complex fluid mechanics and particle dynamics not fully considered in prior fluid treatment systems. The separation system 10 uses the characteristics of circular flow patterns over a solid surface 26. Away from the bottom boundary, flow moves in a circular path with the peripheral velocity balanced by lower pressure in the center of rotation. Centrifugal forces produce slight (secondary) radially outward flow components. Near the bottom, friction reduces the circular velocities and therefore the centrifugal forces, so the low pressure in the center of rotation causes a slight (secondary) inward radial flow along the bottom. This secondary flow transports any particles to the center. From principles of continuity, the radial inward flow turns upward and when this upward flow reaches the vicinity of the surface (another boundary), it must flow outward, assisted by centrifugal forces.

Motion of liquid and particles within the storage chamber 22 can be best described by reference to primary and secondary flow patterns. Partially treated liquid 42 in a plane near the bottom 26 of the storage chamber 22 will tend to rotate slower due to the large frictional influence of the bottom 26. Liquid in a plane near the liquid's surface will rotate faster due to the negligible frictional effects and the influence of the tangential inlet 46. This difference in angular velocity throughout the storage chamber 22 creates a condition where there is a primary circulation in the direction of tangential flow from the second conduit 46, and, a secondary circulation in the meridional plane (normal to the primary circulation as shown in FIG. 5). The resulting path of a particle is thus corkscrew shaped, as shown by flow path 48 of FIG. 4, as it is composed of the primary rotation about the axis of the vortex and of the secondary meridional circulation.

With reference to FIG. 5, the conduits 44 and 46 of storage chamber inlet 30 may be arranged to cause the liquid to rotate within the storage chamber 22 in a primary circulation pattern represented by primary circulation 402. The flow of primary circulation 402 causes the pressure differential described above with respect to the discussion of FIG. 4, which causes a secondary circulation pattern represented by secondary circulation 401. The flow of secondary circulation 401 is normal to the flow of primary circulation 402. In the system as described, the secondary or meridional circulation travels from the center top region 52 to the interior sidewalls 28. It then travels down the interior sidewalls 28 to the floor 26, across the floor 26 to bottom center region 54, where it begins an ascent to center top region 52. Outlet port 33, as placed in the center top position, is coincident with the up flow of the secondary circulation 401 and is placed such that the secondary circulation 401 enters outlet port 33 and leaves storage chamber 22 via outlet 32. The outlet port 33, also referred to as the storage chamber outlet port, may be viewed as the point at which water enters the storage chamber outlet from the storage chamber. Bottom center region 54 is where the combination of currents 401 and 402 creates a point of low velocity. As secondary circulation 401 makes the turn to ascend and primary circulation 402 is diminished by friction, in conjunction with the forces and gradients mentioned above, particles in the stream aided by gravity tend to create a cone of particles 404 at center bottom region 54.

The port 33 may be substantially centered on a vertical axis of induced rotational flow (as viewed from the top) within the storage chamber 22. In one embodiment, the entry port is positioned within the storage chamber at an elevation, relative to the chamber bottom, that is between ½ X and X, where X is defined as the no flow liquid level elevation within the chamber. As used herein, the terminology "no flow liquid level elevation" within the chamber is defined as the surface level to which liquid within the chamber settles immediately following the cessation of flow through the unit and before significant evaporation of any liquid retained within the unit. In another embodiment the entry port of the storage chamber outlet is between ⅔ X and X.

The treated liquid 56, which was permitted to dwell within the storage chamber 22 to enable settling of some particulates therefrom, exits the storage chamber 22 through the storage chamber outlet 32. The outlet 32 is shown as a pipe section extending downwardly from the bypass 24. At one end, the outlet 32 includes an outlet port 33 located at or below the water surface elevation within the storage chamber 22. This arrangement ensures that most floating particulates do not pass into the outlet 32 yet it is not so deep that it entrains captured particles. When the volume of liquid within the storage chamber 22 exceeds the invert of the bypass 24, the treated liquid 56 passes into the pipe section and upon reaching the invert, passes into the bypass 24 via the second inlet 36 of the bypass 24. The treated liquid 56 then continues to the downstream passageway of the bypass 24. It exits the bypass at bypass outlet 38, which may be, or may not be near tank outlet 16.

The separation system 10 may be fabricated with the interior sidewalls 28 of the storage chamber 22 arranged to enhance or disrupt the liquid flow pattern. For example, the interior sidewalls 28 may be configured with a corrugated or helical pattern in a downward spiraling configuration. Such a configuration would enhance flow smoothing and direction. Alternatively, the corrugated or helical pattern arranged in an upwardly spiraling configuration would cause flow turbulence and therefore increasing friction and pressure differentials at the interior sidewalls 28. The bypass 24 may be cylindrical or other selectable shape, such as a trough-shape that is open at the top. It may be fabricated of any material of interest. For example, it may be fabricated of concrete, metal, plastic, a composite or a combination thereof. The bypass 24 may be sized as a function of desired flow patterns, expected flow volumes, and desired bypass rates. It may be fabricated with an interior arranged to smooth or disrupt flow patterns. For example, it may be formed with an interior that is corrugated or to have a helical pattern it may also include one or more baffles.

In one embodiment, the bypass may be formed as an expandable assembly that has a retracted configuration in which the end to end length of the bypass is less than the diameter of the tank, allowing the bypass to be dropped into the top of the tank. When the ends of the bypass align with the tank inlet and outlet, the bypass is expanded (i.e., pulled apart so that the ends of the bypass move into the tank inlet and outlet and can be fastened thereto. In one implementation of this embodiment the bypass assembly may be formed of a central portion and two end portions, with both end portions retractable inward relative to the end portions for the purpose of insertion of the assembly in a tank.

The weir 40 may be curved or flat. It may be fabricated of any material of interest. For example, it may be fabricated of concrete, metal, plastic, a composite or a combination thereof. It may form a permanent part of the bypass 24 or be removably attachable to the invert thereof. Either or both of its positions with respect to the storage chamber inlet 30 and its dimensions within the bypass 24 may be varied as a function of flow volumes to be diverted and to be bypassed. The weir 40 may have a wall height such that its top exceeds the height of the top of the tank inlet 14. The weir 40 may include surface variations, such as a corrugated or helical pattern. The weir may be cut to allow varying flows to pass for example a "V" or "U" shape cut into the weir to allow graduated flows. The storage chamber inlet 30 and the storage chamber outlet 32 may be conduits or pipes as shown. Alternatively, they may form another transfer mechanism. They may be fabricated of the same or different materials as the material used to make the bypass 24. The storage chamber inlet 30 and the storage chamber outlet 32 may be unitary pieces of the bypass 24, or they may be separate pieces permanently or removably attached to the bypass 24.

Figure 6:
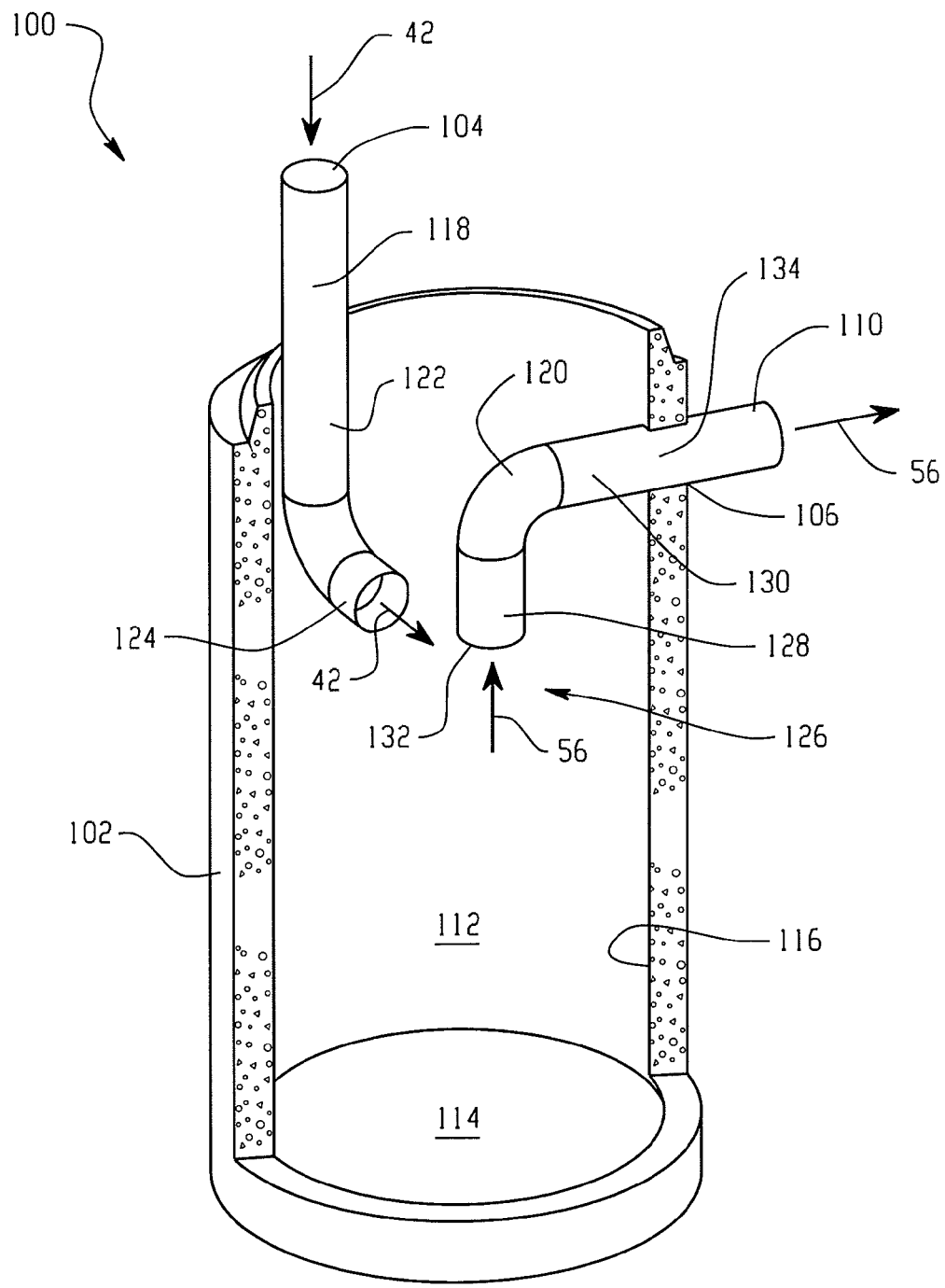
FIG. 6 is a cross-sectional perspective view of a second embodiment of the separation system of the present invention without a bypass showing the storage chamber inlet and outlet, the inlet being a top inlet.

A second embodiment of a separation system 100 is shown in FIG. 6. The system 100 includes a tank 102 having a tank inlet 104 and a tank outlet 106. The tank 102 is preferably made of concrete but may alternatively be fabricated in whole or in parts of metal, plastic, such as fiberglass, or other suitable materials or a combination thereof. It may be fabricated of an existing manhole. The tank inlet 104 may be used to receive untreated liquid from a source. The source may be an upstream transfer system joined to the tank inlet 104 by an upstream conduit. Alternatively, the tank inlet 104 may receive the untreated liquid directly, such as from a storm drain. For example, the upstream transfer system may include a drainage system from a roadway or a parking lot. Similarly, the tank outlet 106 may be used to transfer treated liquid to a receiver. The receiver may be a downstream transfer system joined to the tank outlet 106 by a downstream conduit 110. The downstream transfer system may include a multi-user water treatment plant, natural or artificial surface waters, or subsurface containment.

The tank 102 includes a storage chamber 112. The storage chamber 112 is generally shaped to produce or otherwise allow the rotational movement of liquid therein. Although not specifically limited thereto, the storage chamber 112 is preferably cylindrical in shape. The tank 102 may or may not be of the same shape. The storage chamber 112 includes a bottom 114 and interior sidewalls 116 in a cylindrical form but may alternatively be in a polygonal form. The storage chamber 112 further includes an inlet 118 and an outlet 120. The tank 102 may include a lid or a grate as an entrance. The tank 102 optionally arranged with a lid may include the equalizing line referred to above with regard to tank 12 of separation system 10. In the illustrated embodiment, the storage chamber 112 is the space established by the bottom 114 and interior sidewalls 116 and extends upwardly from the bottom 114 to a plane at or below the level of the lid or the grate. Alternatively, the height of the interior sidewalls 116 may be arranged to be above the highest possible water surface elevation, thereby eliminating the need for a lid while allowing the interior space of the storage chamber 112 to remain open for inspection and maintenance.

The storage chamber inlet 118 is arranged to receive untreated liquid 42 and includes a first inlet conduit 122 and a second inlet conduit 124. The first inlet conduit 122 is, a pipe vertically oriented within the tank 102 when the tank 102 is in an upright operational position and configured to initiate passage of the untreated liquid 42 into the storage chamber 112. That is, it is at or about perpendicular with respect to the plane defined by the bottom 114 of the storage chamber 112. The second inlet conduit 124 is, effectively, a second pipe leg in fluid communication with the first inlet conduit 122. It is configured and arranged to divert the untreated liquid 42 into a tangential flow pattern initially along the interior sidewalls 116 of the storage chamber 112. While the storage chamber inlet 118 has been described to include the arrangement of second inlet conduit 124 in relation to first inlet conduit 122 as shown, it may be another configuration that initiates a flow pattern within the storage chamber 112 that applies centrifugal forces to untreated liquid components, including contaminants.

As with the embodiment of the separation system 10 described with respect to FIGS. 1-4, the outlet 120 from the storage chamber 112 of system 100 of FIG. 6 is positioned where it enhances the desired flow pattern and where turbulence may be minimized. That position is typically at or near center top region 126. Treated liquid 56 reaching that position has had the greatest dwell time within the storage chamber 112. That is, the outlet 120 includes an opening positioned substantially centered on a vertical axis about which fluid rotation occurs, which in the illustrated embodiment also happens to the center axis of the storage chamber 112. More specifically, the outlet 120 includes a first outlet conduit 128 and a second outlet conduit 130, each represented as a pipe section in FIG. 6. The second outlet conduit 130 is arranged to enable the passage of liquid out of the storage chamber 112. It may be at or about parallel to the bottom 114 of the storage chamber 112, but is not limited to that arrangement.

The first outlet conduit 128 extends downwardly from the second conduit outlet 130 and includes a storage chamber outlet port 132 positioned within the storage chamber 112 at or below the water surface elevation within the storage chamber 112. This arrangement ensures that most floating particulates do not pass into the outlet 120. When the volume of liquid within the storage chamber 112 exceeds the invert of the second outlet conduit 130, treated liquid 56 passes into the second outlet conduit 130 from the first outlet conduit 128. The treated liquid 56 then continues through the downstream passageway established by the second outlet conduit 130. It exits the second outlet conduit 130 at 134, which may be, or may not be near tank outlet 106, and then exits the tank 102 at tank outlet 106.

The separation system 100 may be fabricated with the interior sidewalls 116 of the storage chamber 112 arranged to enhance or disrupt the flow pattern. For example, the interior sidewalls 116 may be configured with a corrugated or helical pattern in a downward spiraling configuration. Such a configuration would enhance flow smoothing and direction. Alternatively, the corrugated or helical pattern arranged in an upwardly spiraling configuration would cause flow turbulence which would increase friction and pressure differentials at the interior sidewalls 116. The tank 102 may include one or more baffles.

Figure 7:
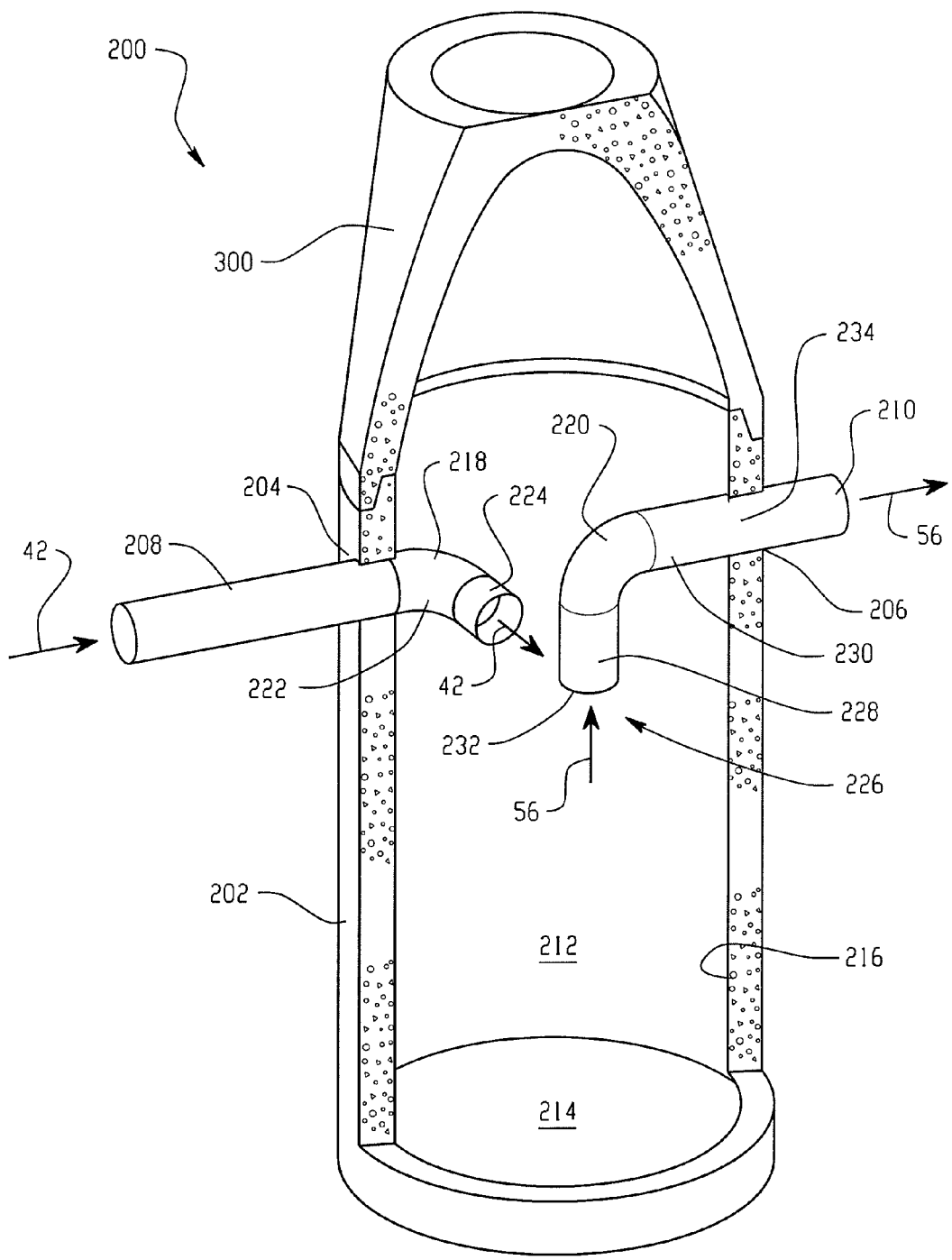
FIG. 7 is a cross-sectional perspective view of a third embodiment of the separation system of the present invention without a bypass showing the storage chamber inlet and outlet, the inlet being a side inlet.

A third embodiment of the separation system 200 is shown in FIG. 7. The system 200 includes a tank 202 having a tank inlet 204 and a tank outlet 206. The tank 202 is preferably made of concrete but may alternatively be fabricated in whole or in parts of metal, plastic, such as fiberglass, or other suitable materials or a combination thereof. It may be fabricated of an existing manhole including, for example, manhole transition 300. The tank inlet 204 may be used to receive untreated liquid from a source. The source may be an upstream transfer system joined to the tank inlet 204 by an upstream conduit 208 or other source as described above. Similarly, the tank outlet 206 may be used to transfer treated liquid to a receiver. The receiver may be a downstream liquid transfer system joined to the tank outlet 206 by a downstream conduit 210. The downstream liquid transfer system may include a multi-user water treatment plant, natural or artificial surface waters, or subsurface containment.

The tank 202 may include a storage chamber 212. The storage chamber 212 is generally shaped to produce or otherwise allow the rotational movement of liquid therein. Although not specifically limited thereto, the storage chamber 212 is preferably cylindrical in shape. The tank 202 may or may not be of the same shape. In the illustrated embodiment, the storage chamber 212 includes a bottom 214 and interior sidewalls 216 in a cylindrical form but may alternatively be in a polygonal form. The storage chamber 212 further includes an inlet 218 and an outlet 220. The tank 202 may include a lid. The tank 202 optionally arranged with a lid may include the equalizing line referred to above with regard to tank 12 of separation system 10. The storage chamber 212 is the space established by the bottom 214 and interior sidewalls 216 and extends upwardly from the bottom 214 to a plane at or below the level of the lid. Alternatively, the height of the interior sidewalls 216 may be arranged to be above the highest possible water surface elevation, thereby eliminating the need for a lid while allowing the interior space of the storage chamber 212 open for inspection and maintenance.

The storage chamber inlet 218 is arranged to receive untreated liquid 42 and includes a first inlet conduit 222 and a second inlet conduit 224. The first inlet conduit 222 is a pipe positioned as a side inlet structure, generally arranged to be at or near parallel with the plane defined by the bottom 214 of the storage chamber 212, but not limited thereto. The first inlet conduit 222 is configured to initiate passage of the untreated liquid 42 into the storage chamber 212. The second inlet conduit 224 is, effectively, a second pipe leg in fluid communication with the first inlet conduit 222. It is configured and arranged to divert the untreated liquid 42 into a tangential flow pattern initially along the interior sidewalls 216 of the storage chamber 212. While the storage chamber inlet 218 has been described to include the arrangement of second inlet conduit 224 in relation to first inlet conduit 222 as shown, it may be another configuration that initiates a flow pattern within the storage chamber 212 that applies centrifugal forces to untreated liquid components, including contaminants.

As with the embodiment of the separation system 10 described with respect to FIGS. 1-4, the outlet 220 from the storage chamber 212 of system 200 of FIG. 7 is positioned where it enhances the secondary currents and where it causes minimal disruption of the desired flow pattern and where turbulence is minimized. That position is at or near center top region 226. Treated liquid 56 reaching that position has had the greatest dwell time within the storage chamber 212. That is, the outlet 220 includes an opening positioned about at the center axis of rotational flow within the storage chamber 212. More specifically, the outlet 220 includes a first outlet conduit 228 and a second outlet conduit 230, each represented as a pipe section in FIG. 7. The second outlet conduit 230 is arranged to enable the passage of liquid out of the storage chamber 212. It may be at or about parallel to the bottom 214 of the storage chamber 212, but is not limited to that arrangement.

The first outlet conduit 228 extends downwardly from the second conduit outlet 230 and includes a storage chamber outlet port 232 positioned within the storage chamber 212 at or below the water surface elevation within the storage chamber 212. This arrangement ensures that most floating particulates do not pass into the outlet 220. When the volume of liquid within the storage chamber 212 exceeds the invert of the second outlet conduit 230, treated liquid 56 passes into the second outlet conduit 230 from the first outlet conduit 228. The treated liquid 56 then continues through the downstream passageway established by the second outlet conduit 230. It exits the second outlet conduit 230 at 234, which may be, or may not be near tank outlet 206, and then exits the tank 202 at tank outlet 206.

The separation system 200 may be fabricated with the interior sidewalls 216 of the storage chamber 212 arranged to enhance or disrupt the flow pattern. For example, the interior sidewalls 216 may be configured with a corrugated or helical pattern in a downward spiraling configuration. Such a configuration would enhance flow smoothing and direction. Alternatively, the corrugated or helical pattern arranged in an upwardly spiraling configuration would cause flow turbulence which would increase friction and pressure differentials at the wall. It may be fabricated of any material of interest. For example, it may be fabricated of concrete, metal, plastic, a composite or a combination thereof. The tank 202 may include one or more baffles. Likewise other illustrated embodiments may include baffles.

Figure 8:
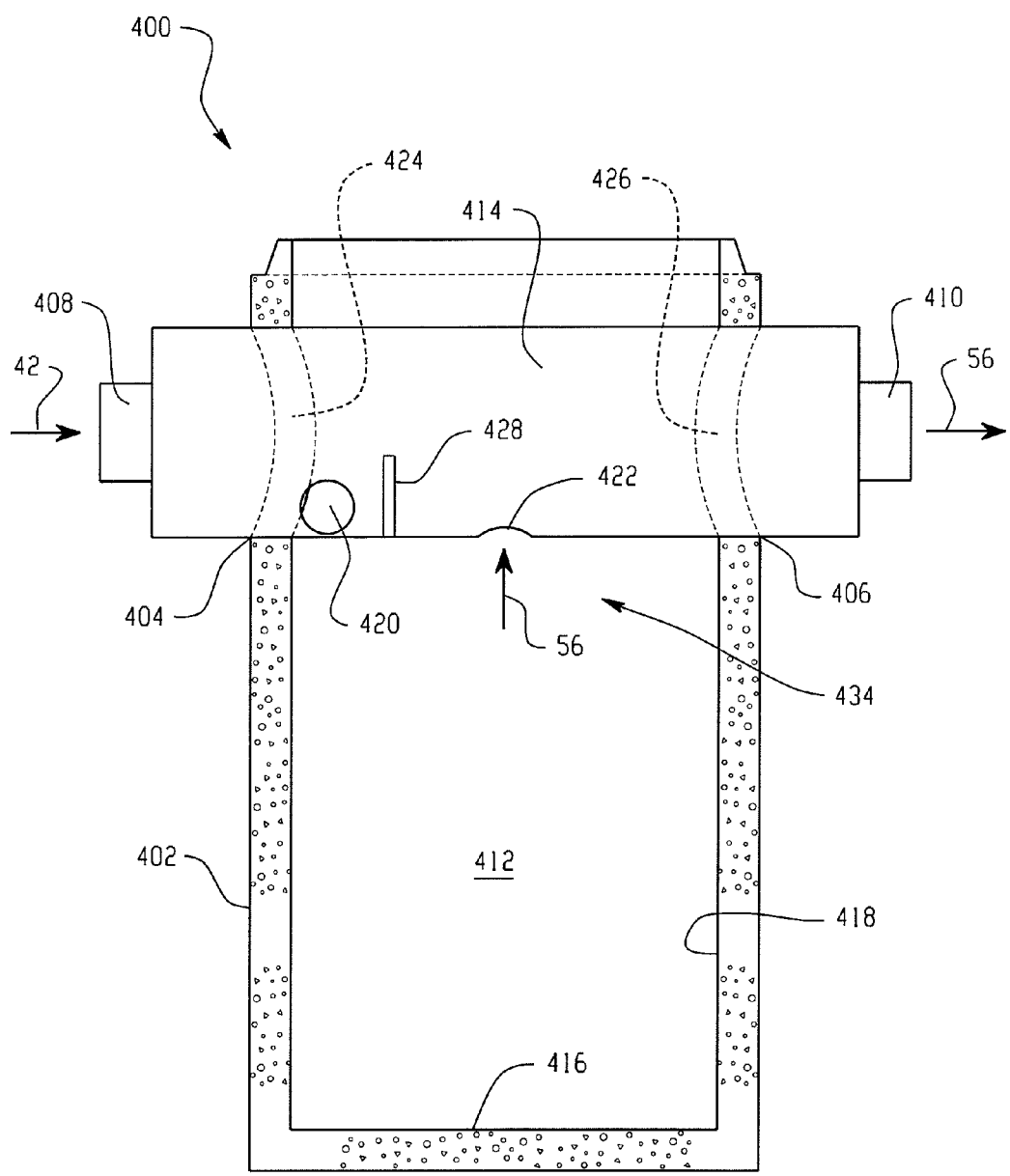
FIG. 8 is a partially transparent side view of a fourth embodiment of the separation system of the present invention showing, the bypass, the weir, the storage chamber inlet and the storage chamber outlet.
Figure 9:
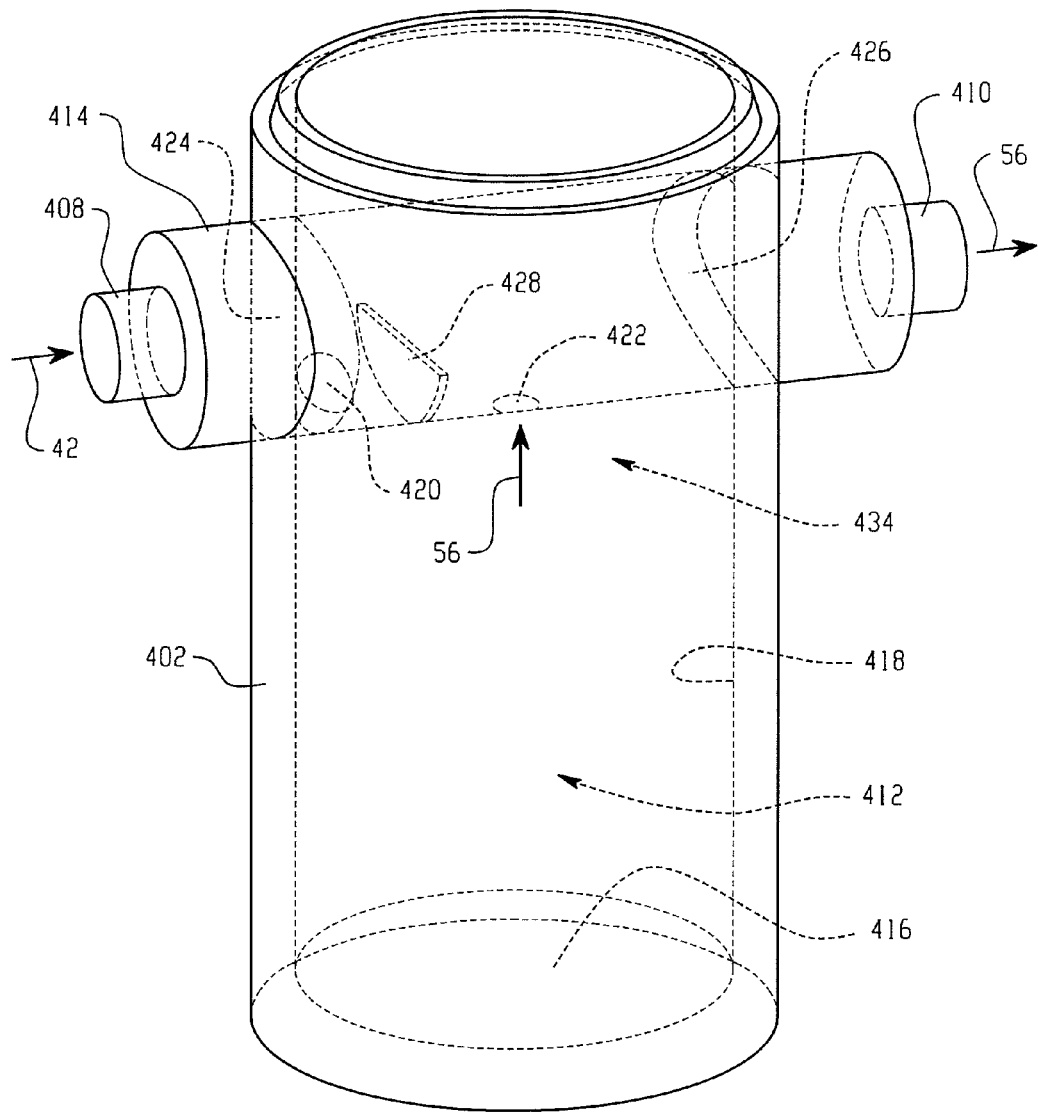
FIG. 9 is a partially transparent perspective view of the separation system of FIG. 8 also showing the bypass in transparent form.
Figure 10:
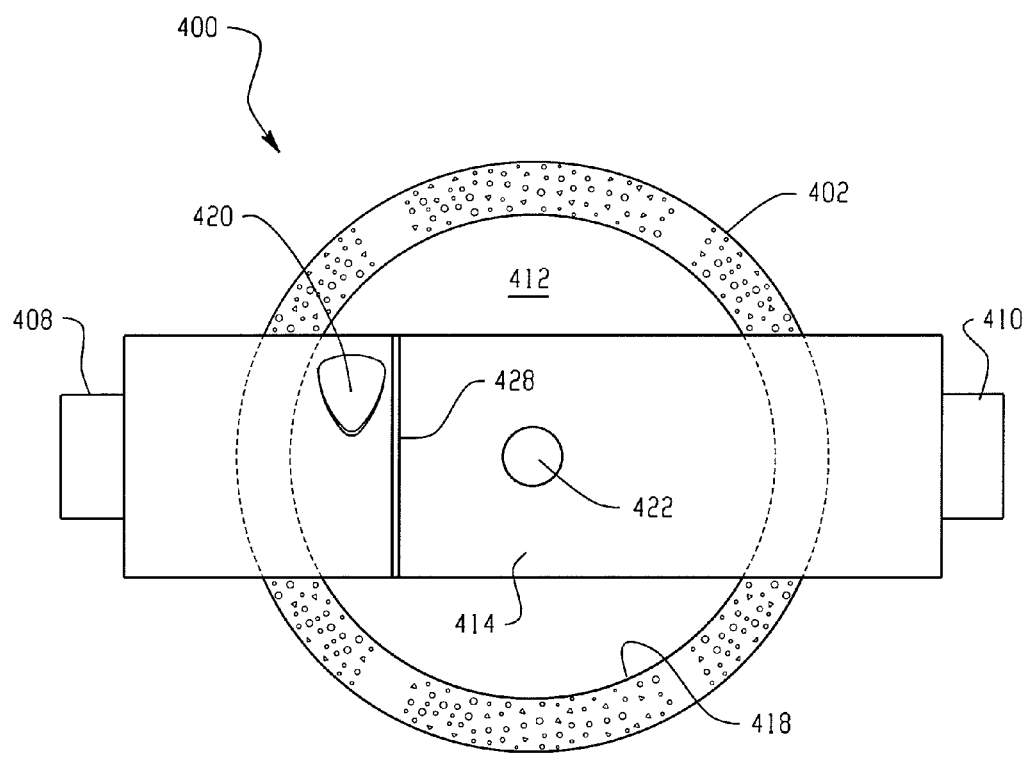
FIG. 10 is a partially transparent top view of the separation system of FIG. 8.

A fourth embodiment of a separation system 400 is shown in FIGS. 8-10. The system 400 includes a tank 402 having a tank inlet 404 and a tank outlet 406. The tank 402 is preferably made of concrete but may alternatively be fabricated in whole or in parts of metal, plastic, such as fiberglass, or other suitable materials or a combination thereof. It may be fabricated of an existing manhole. The tank inlet 404 may be used to receive untreated liquid from a source. The source may be an upstream transfer system joined to the tank inlet 404 by an upstream conduit 408 or other source as described above. Similarly, the tank outlet 406 may be used to transfer treated liquid to a receiver. The receiver may be a downstream transfer system joined to the tank outlet 406 by a downstream conduit 410. The downstream transfer system may include a multi-user water treatment plant, natural or artificial surface waters, or subsurface containment.

The tank 402 includes a storage chamber 412 and a bypass 414. The storage chamber 412 is generally shaped to produce or otherwise allow the rotational movement of liquid therein. Although not specifically limited thereto, the storage chamber 412 is preferably cylindrical in shape. The tank 402 may or may not be of the same shape. The storage chamber 412 includes a bottom 416 and interior sidewalls 418 in a cylindrical form but may alternatively be in a polygonal form. The storage chamber 412 further includes an inlet 420 and an outlet 422. The tank 402 may include a lid or a grate as an alternative entrance. The tank 402 optionally arranged with a lid may include the equalizing line referred to above with regard to tank 12 of separation system 10. The storage chamber 412 is the space established by the bottom 416 and interior sidewalls 418 and extends upwardly from the bottom 416 to a plane at or below the level of the optional lid or the equalizing line. It may exceed the height of the bypass 414. Alternatively, the height of the interior sidewalls 418 may be arranged to be above the highest possible water surface elevation, thereby eliminating the need for a lid while allowing the interior space of the storage chamber 412 open for inspection and maintenance.

The bypass 414 includes a first inlet 424 at or near the tank inlet 404, a first outlet that is the inlet 420 of the storage chamber 412 to establish direct fluid communication with the storage chamber 412. The bypass 414 also includes a second inlet that is the outlet 422 of the storage chamber 412 to establish direct fluid communication with the storage chamber 412. The bypass 414 further includes a second outlet 426 at or near the tank outlet 406. The bypass 414 also includes a weir 428. The weir 428 diverts untreated liquid entering the bypass 414 at the first inlet 424 through the storage chamber inlet 420 into the storage chamber 412. The weir 428 is further arranged within the bypass 414 to allow excess untreated liquid to pass directly to the second outlet 426 without passing through the storage chamber 412. The bypass 414 may be substantially or completely closed except for the described inlets and outlets. An offset difference between the invert of 410 and the invert of 414 causes a normal or nominal water surface elevation in the system at least equal to the elevation of the invert of 410. This arrangement ensures that most floating particulates do not pass into outlet 422.

The separation system 400 operates substantially as follows. Untreated liquid 42 enters the tank 402 at tank inlet 404. The untreated liquid 42 passes into the bypass 414 at first inlet 424. The untreated liquid 42 then enters the storage chamber inlet 420, which is located near the first inlet 424 at or above the invert of the bypass 414. The weir 428 is positioned downstream of the storage chamber inlet 420 between the storage chamber inlet 420 and the storage chamber outlet 422. It acts to divert untreated liquid 42 into the storage chamber inlet 420 under relatively low flow rates. Under relatively high flow rates, the weir 428 diverts a portion of the untreated liquid 42 into the storage chamber 412 through storage chamber inlet 420 while the remainder of the untreated liquid 42 moves directly through the bypass 414 to the tank outlet 406. The amount of untreated liquid 42 diverted into the storage chamber 412 and the amount allowed to bypass the storage chamber 412 are dependent upon the selected height of the weir 428 within the bypass 414 and the dimensions of the bypass 414.

It can be seen from FIGS. 8-10 that the separation system 400 differs from the separation system 10 in that the storage chamber inlet 420 and the storage chamber outlet 422 are ports of the bypass 414 rather than conduit arrangements connected to the bypass. The storage chamber inlet 420 is preferably arranged and configured to divert the untreated liquid 42 into a tangential flow pattern initially along the interior sidewalls 418 of the storage chamber 412. For example, the storage chamber inlet 420 may be a port of the bypass 414 arranged to cause the untreated liquid 42 entering the bypass 414 to be directed at an angle change of about 90 degrees. Further, the port of the bypass 414 as the storage chamber inlet 420 may be round or it may be shaped as shown in FIG. 10 such that flow turbulence is reduced as the untreated liquid 42 exits the bypass 414.

As with the embodiment of the separation system 10 described with respect to FIGS. 1-4, the outlet 422 from the storage chamber 412 of system 400 of FIGS. 8-10 is positioned where it enhances the secondary currents, where it causes little disruption of the desired flow pattern and where turbulence may be minimized. That position is at or near center top region 434. Treated liquid 56 reaching that position has had the greatest dwell time within the storage chamber 412 as previously noted. That is, the storage chamber outlet 422 is a port of the bypass 414 located about at the center axis of the storage chamber 412 at or below the water surface elevation within the storage chamber 412. When the volume of liquid within the storage chamber 412 exceeds the level of the storage chamber outlet 422, treated liquid 56 passes into the bypass 414 and exits the bypass 414 through second outlet 426.

The separation system 400 may be fabricated with the interior sidewalls 418 of the storage chamber 412 arranged to enhance or disrupt the liquid flow pattern. For example, the interior sidewalls 418 may be configured with a corrugated or helical pattern in a downward spiraling configuration. Such a configuration would enhance flow smoothing and direction. Alternatively, the corrugated or helical pattern arranged in an upwardly spiraling configuration would cause flow turbulence which would increase friction and pressure differentials at the wall. It may be fabricated of any material of interest. For example, it may be fabricated of concrete, metal, plastic, a composite or a combination thereof.

Figure 11:
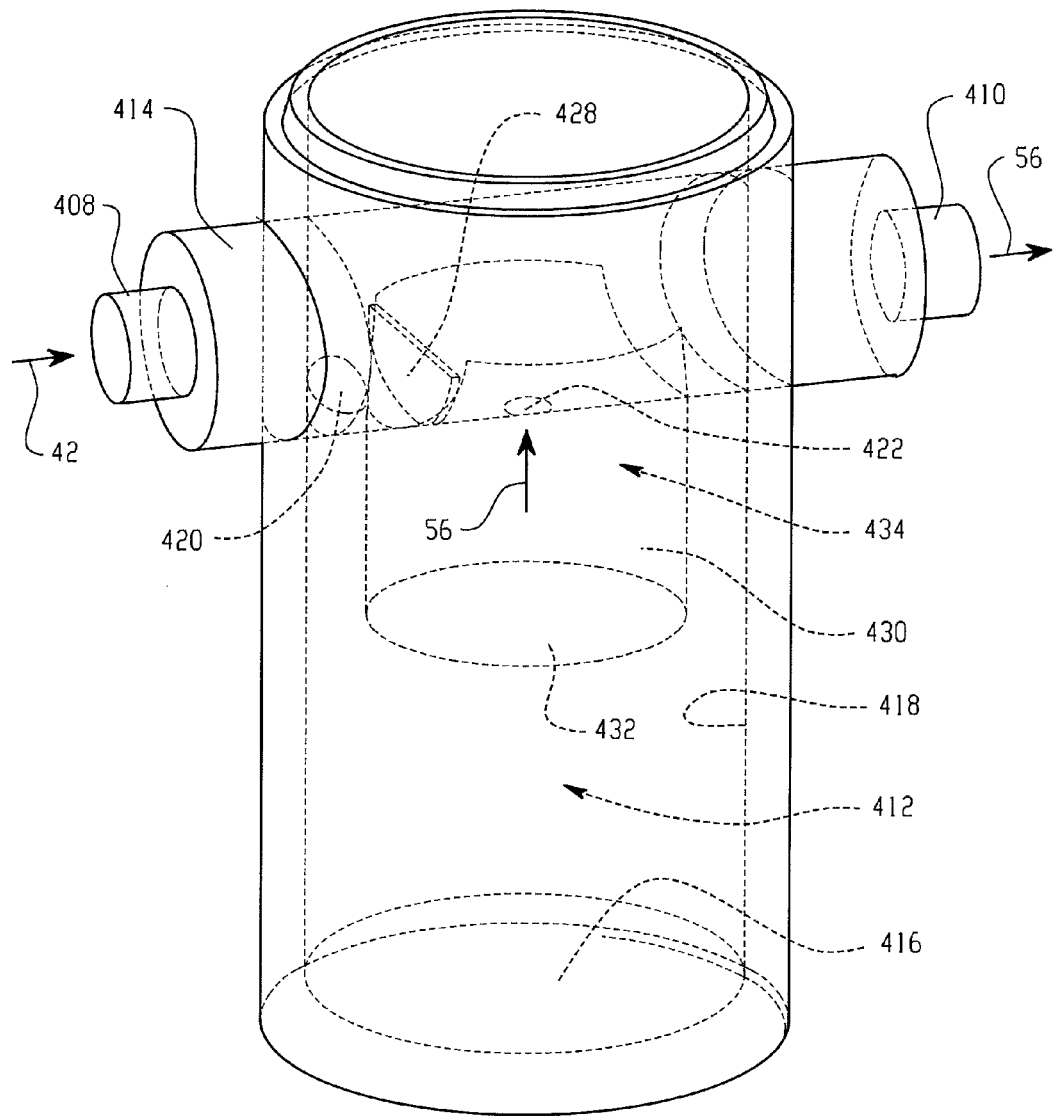
FIG. 11 is a partially transparent perspective view of an alternate version of the separation system of FIG. 8 including a baffle for liquid flow modification within the storage chamber.

The tank 402 may include one or more baffles. For example, as shown in FIG. 11, the tank 402 includes baffle 430 arranged to be either permanently or removably attached to, and extend downwardly from, the bypass 414 to a location within the storage chamber 412 above the bottom 416. The baffle 430 is preferably a cylinder or other shape suitable to be attached to the bypass 414 in an arrangement to partially or completely surround the storage chamber outlet 422. The baffle 430 includes opening 432 to allow liquid within the storage chamber 412 to pass to the storage chamber outlet 422. The baffle 430 is arranged to block at least a portion of floating particulates from entering the bypass 414 through the storage chamber outlet 422. The baffle may be positioned and oriented within the expected flow pattern within the storage chamber 412 at a location causing minimal disruption of that flow pattern. The preferred location for that purpose is upper center region 434 of the storage chamber 412.

The baffle 430 may be fabricated with either or both of the interior and exterior sidewalls arranged to enhance or disrupt the liquid flow pattern. For example, either or both of the sidewalls may be configured with a corrugated or helical pattern in a downward spiraling configuration. Such a configuration would enhance flow smoothing and direction. Alternatively, the corrugated or helical pattern arranged in an upwardly spiraling configuration would cause flow turbulence which would increase friction and pressure differentials at the wall. It may be fabricated of any material of interest. For example, it may be fabricated of concrete, metal, plastic, a composite or a combination thereof.

Referring again to FIGS. 1-4, the illustrated embodiment shows an orientation in which the swirling flow within the storage chamber is created in a clockwise direction (as viewed from the top of the unit). Alternatively, the unit could be constructed with conduit 46 facing the opposite direction to generate a counterclockwise flow (as viewed from the top of the unit). Preliminary testing has suggested that, depending upon the exact size and configuration of a unit, some variation in effectiveness may occur as between clockwise and counterclockwise rotational flow, perhaps due to the vortex induced in the piping that leads from the bypass to the storage chamber. However, in certain configurations it appears that the selection of clockwise or counterclockwise rotational flow in the storage chamber may not have any significant impact on the effectiveness of the unit.

A filter screen or other filter arrangement may also be associated with any one of the outlets 32, 120, 220 or 422 of the various embodiments to aid in retaining certain floatables and/or solids in the storage chamber. Further, in those embodiments including a bypass, a head equalization baffle may be incorporated into the bypass downstream of the storage chamber outlet causing a back pressure that slows flow down through the treatment path as described in U.S. Pat. No. 6,991,114.

Figure 12:
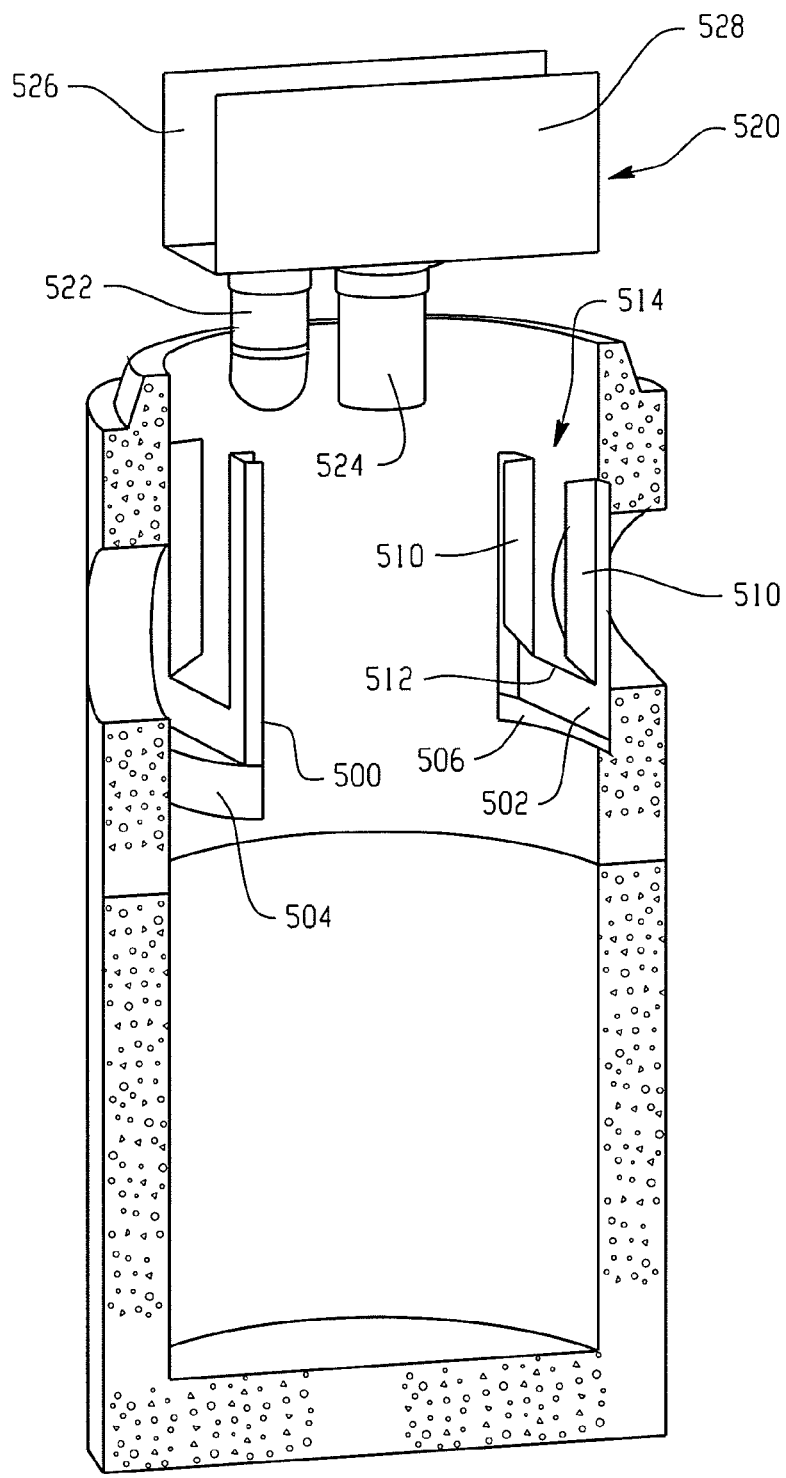
FIG. 12 is a partial, exploded cutaway of one embodiment of a separator assembly.
Figure 13:
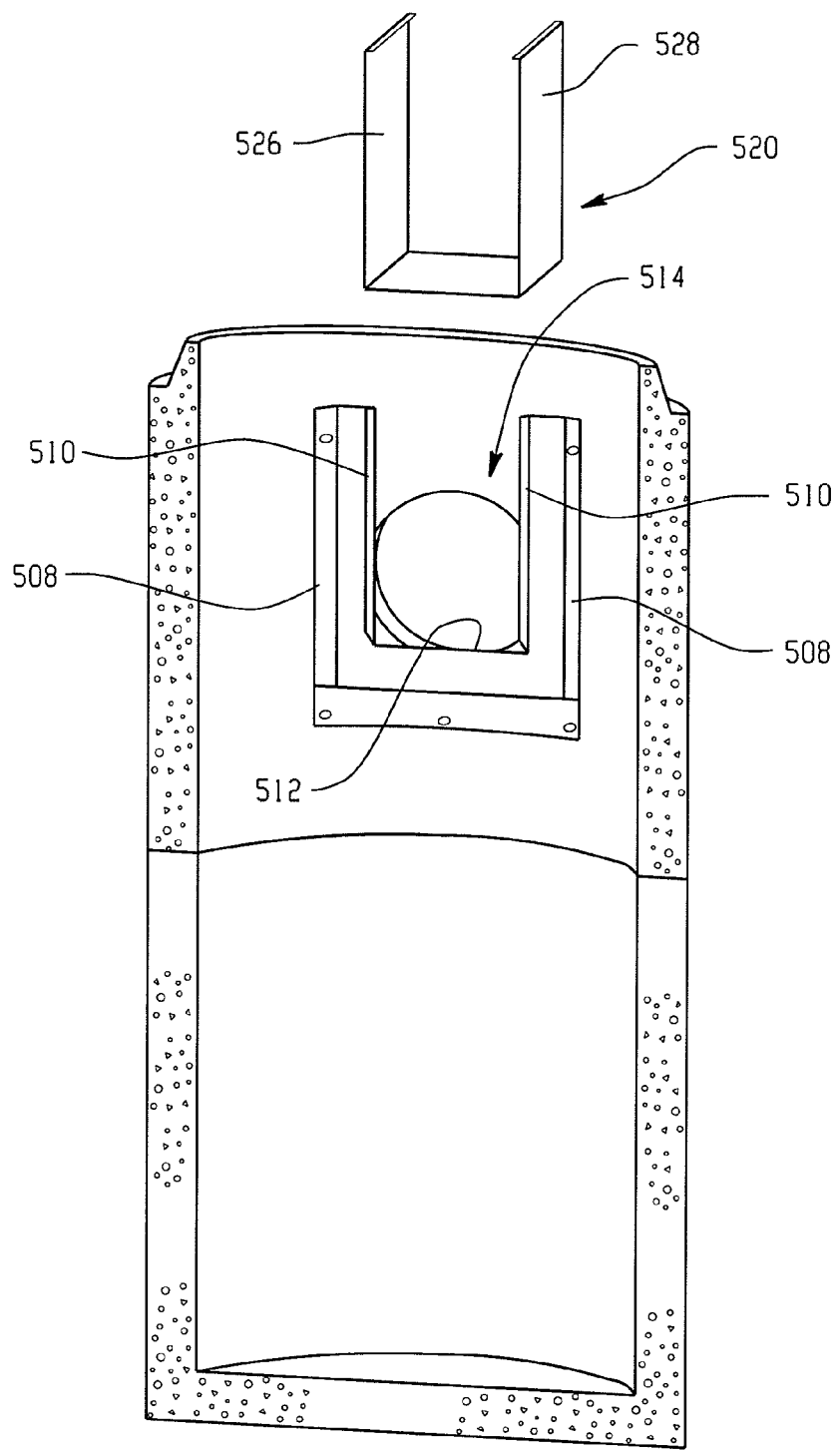
FIG. 13 is a partial cutaway of the assembly of FIG. 12.
Figure 14:
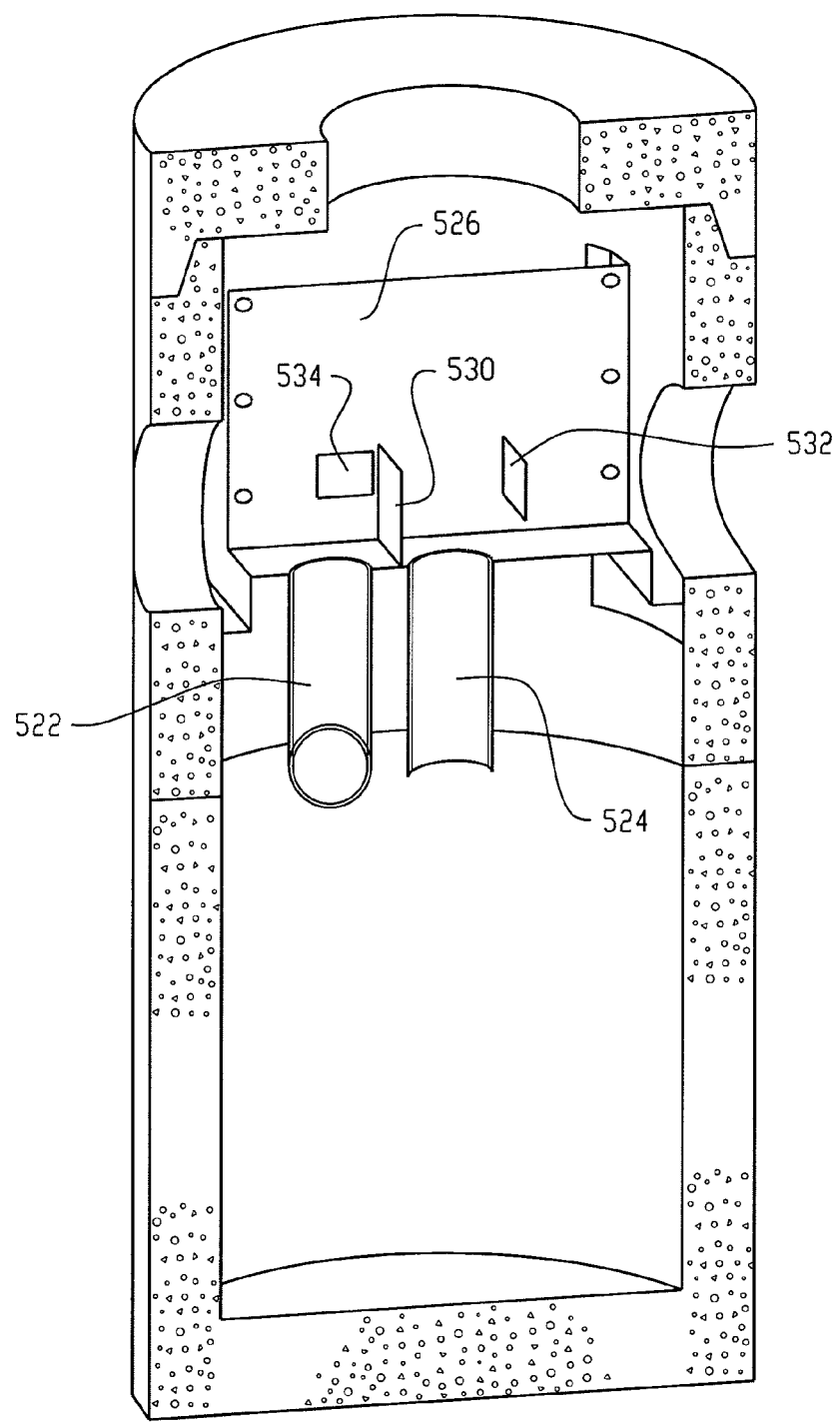
FIG. 14 is a partial cutaway of the assembly of FIG. 12 with bypass within the tank.
Figure 15:
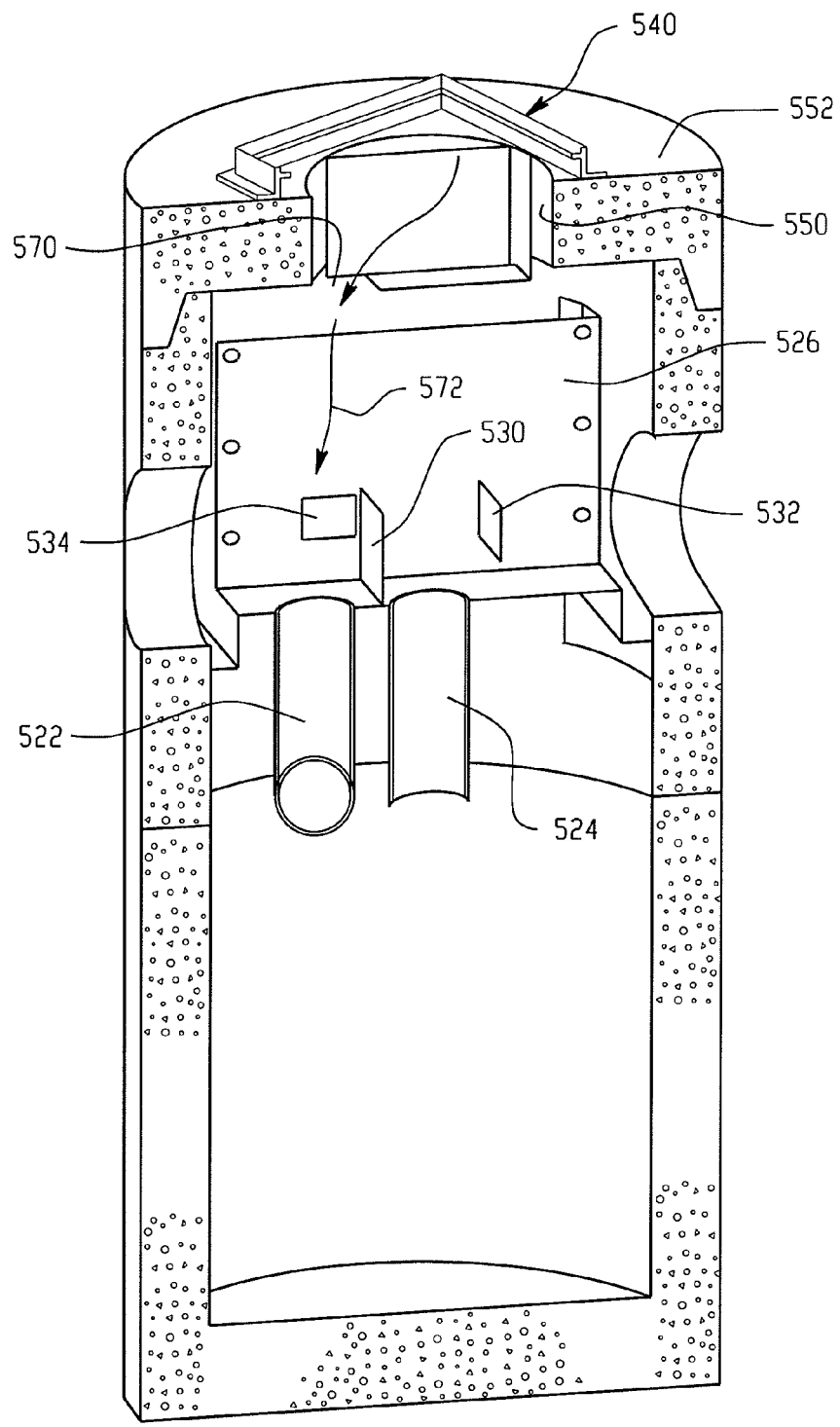
FIG. 15 is a partial cutaway of a separator assembly with a top inlet.
Figure 16:
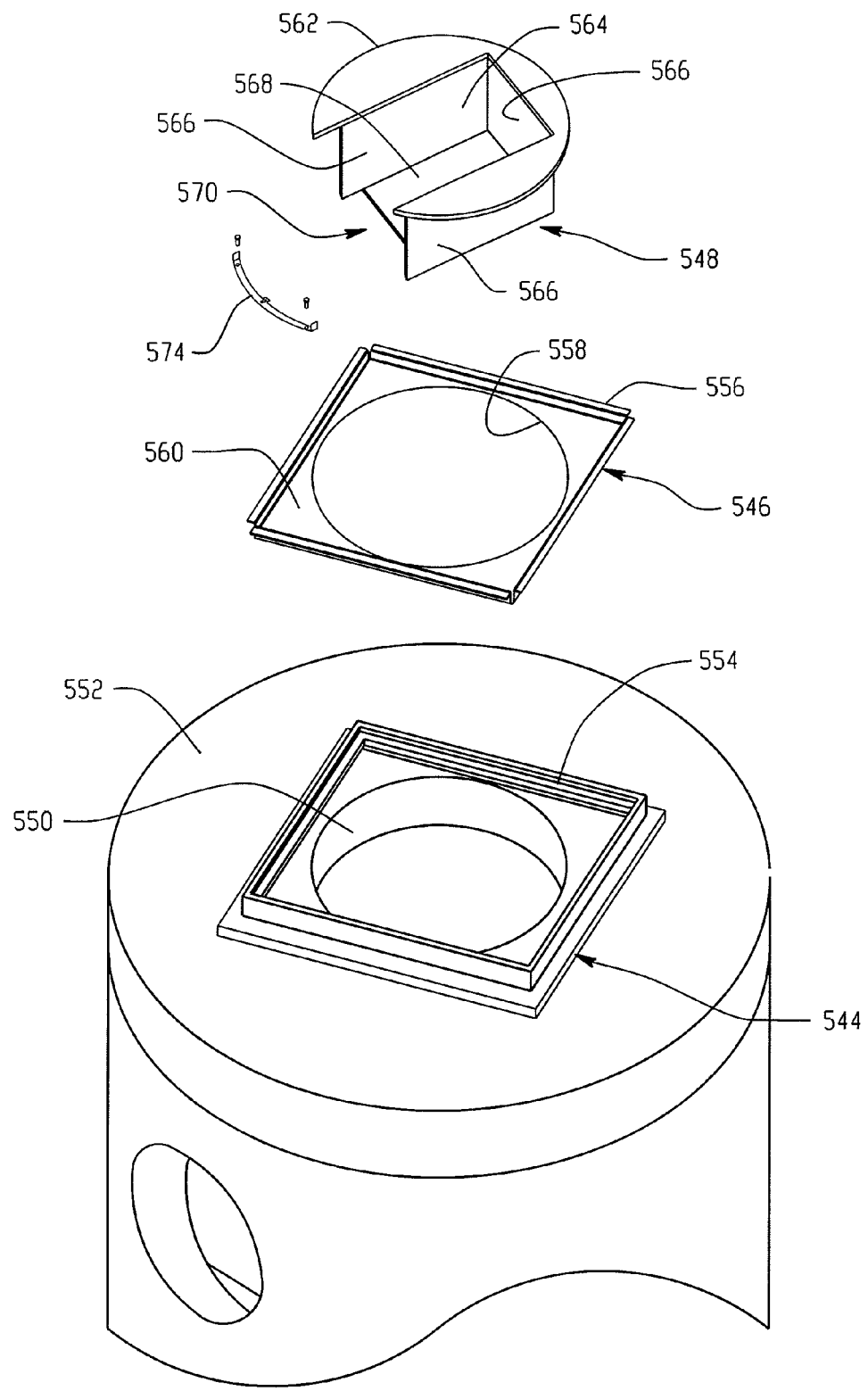
FIG. 16 is an exploded view of the top of the assembly of FIG. 15.
Figure 17:
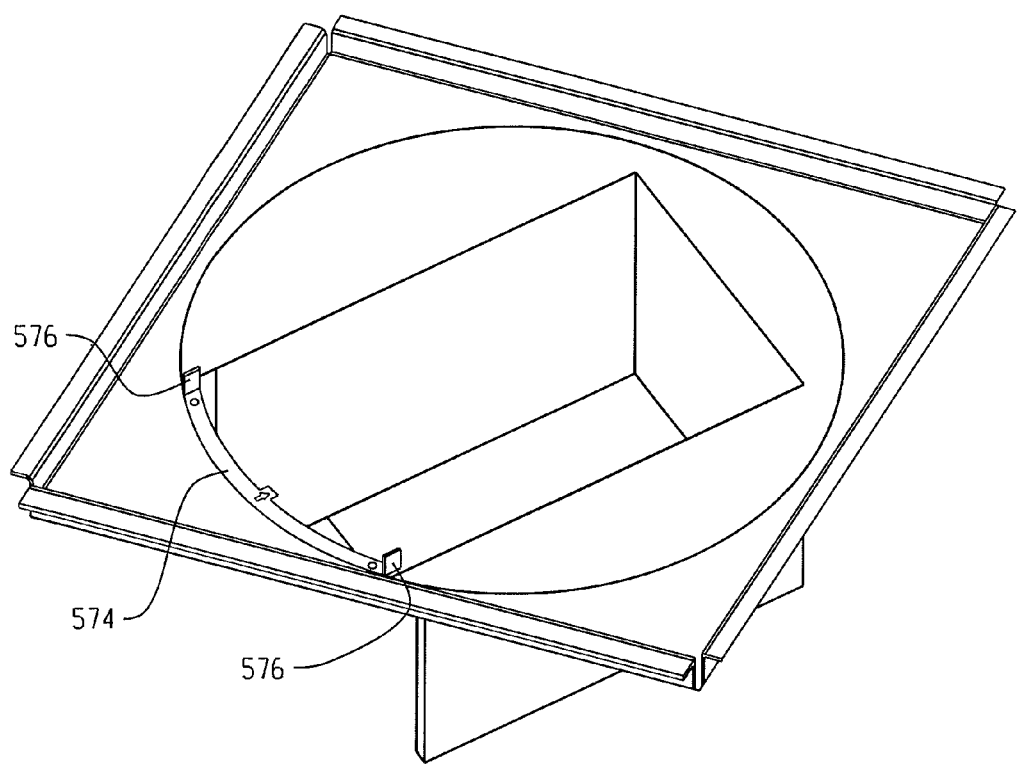
FIG. 17 is a perspective of a top inlet assembly.
Figure 18:
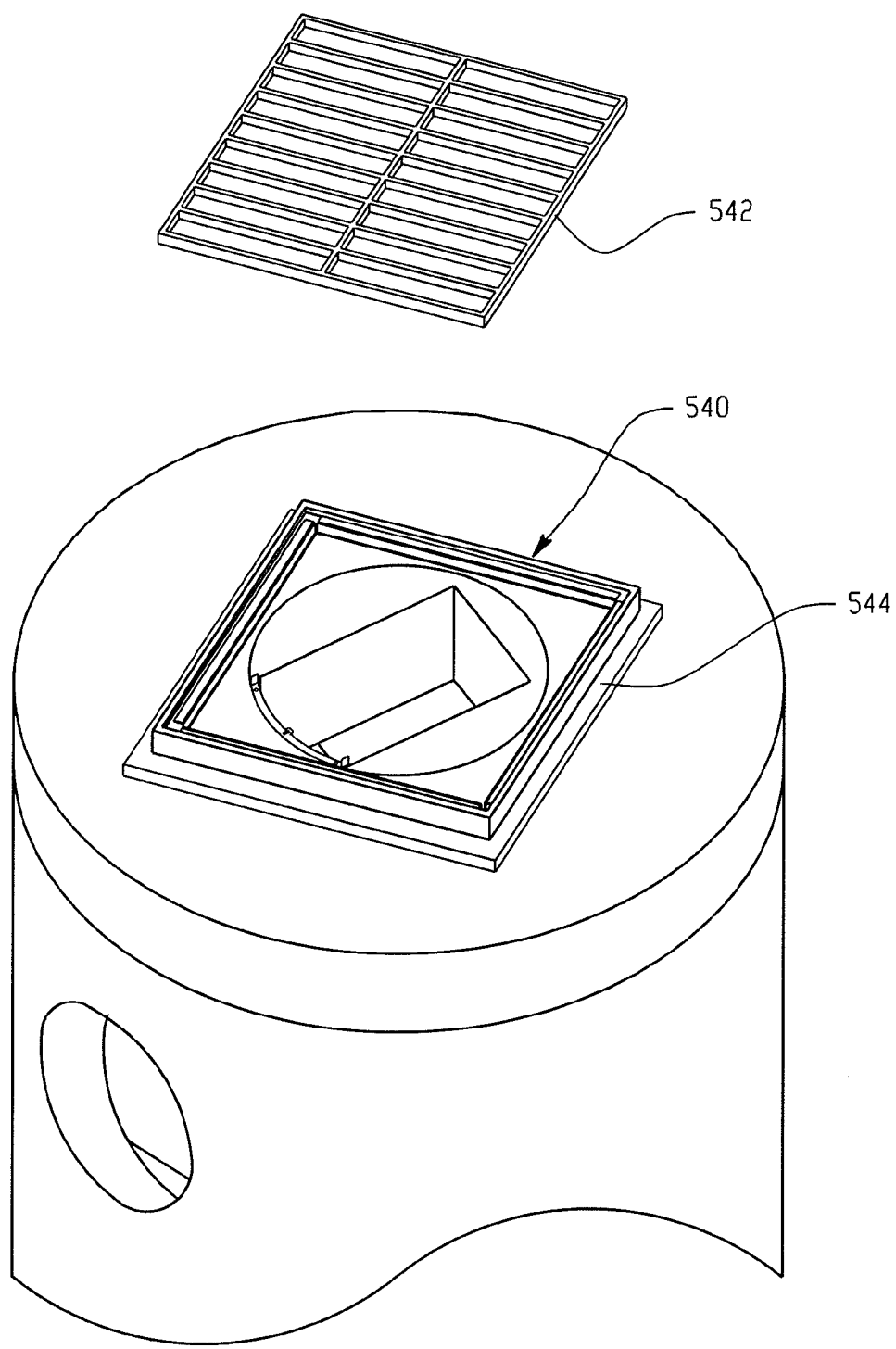
FIG. 18 is a top perspective of the assembly of FIG. 15 showing an inlet grate.

Referring now to FIGS. 12-14, an alternative assembly configuration is shown in which bypass mount frames 500 and 502 are connected to the tank sidewalls respectively adjacent the inlet and outlet of the tank. Each bypass mount frame may include curved portions 504 and 506 for matching with the curved tank sidewalls. Side portions 508 extend upward along the side edges of the inlet or outlet. The portions 504, 506 and 508 may be used to secure the frames to the tank via suitable fastening means (e.g., concrete anchors, screws or other rigid fasteners depending upon the material of the tank and frame, or an epoxy or other liquid/chemical fastener material). Each mount frame includes respective side flanges 510 and bottom support surface 512 that define a u-shaped receiving slot 514 that is open at the top. The mount frames may be readily formed of a sheet metal material, such as stainless steel or aluminium, but other materials could be used as well. The bypass structure 520 has a U-shaped configuration similar to that of the frame slots 514 so that the ends of the bypass structure can be received in the slots 514. In this manner the mount frames support the bypass structure within the tank. The bypass structure may be pre-assembled with pipes 522 and 524 to form the storage chamber inlet and outlet respectively, and the pre-assembled bypass structure may be dropped into the tank once the mount frames have been installed. Pipe 522 may have an L-shaped configuration to produce the desired flow pattern previously described. The end portions of the bypass sidewalls 526 and 528 may be secured to the flanges 510 of the mount frames using suitable fastening means (e.g., screws, bolts, welding, or an epoxy or other liquid/chemical fastener material depending upon the materials used. In one implementation, the bypass structure is formed by bending a metal sheet into the u-shaped configuration. As best seen in FIG. 13, the upper end of each sidewall 526 and 528 may be bent inward (or outward) to form a lip providing structural rigidity. Multiple pieces of sheet metal bent and welded to form the bypass could also be used. Other materials could also be used. As most clearly seen in FIG. 14, the internal space of the bypass structure may include weir 530 and head equalization baffle 532 on opposite sides of the storage chamber outlet defined by pipe 524. Moreover, the bypass sidewall 526 may include a secondary storage chamber spillover inlet 534. The storage chamber spillover inlet 534 is positioned to allow floatables such as oil to enter the storage chamber without having to travel through the storage chamber inlet 522, and before such floatables pass over the weir 530.

Referring now to FIGS. 15-18, a variation having a grate-type inlet 540 at the top is shown. The grate-inlet is formed by a grate 542, frame 544, frame insert 546 and flow directing box insert 548. The frame 544 is positioned around a tank inlet 550 in the top wall 552 of the tank, and includes an internal ledge 554 along each side for receiving and supporting a corresponding externally extending flange 556 along each side of the frame insert 546. The frame insert also includes a through opening 558 that aligns with the opening 550. Bottom wall 560 of the frame insert 546 may also rest upon the top wall of the tank when placed into the frame 544. The flow directing box insert 548 includes an upper flange 562 circumscribing a portion of the box inlet 564, which is rectangular-shaped in the illustrated embodiment. Sidewalls 566 extend down from the flange 562 to form the box structure that includes a partial bottom wall 568. The bottom wall does not extend the full length of the box-shape, thereby leaving a flow gap 570 that will permit incoming stormwater to flow into the tank. The box insert 548 is mounted to the frame insert 540 so that incoming flow of stormwater is directed to the desired location within the tank, typically into the bypass at the upstream side of the weir as shown by the flow arrows 572 in FIG. 15. An insert positioning bracket 574 is provided for assuring that the desired orientation and position of the flow gap 570 is maintained. Specifically, the positioning bracket 574 is secured (e.g., by screws or other fastening means) to the inner edge of frame insert bottom wall 560 at a specific location around the periphery of opening 558. The bracket 574 is sized to fit within the open end of box inlet 564 and includes upwardly extending fingers 576 that are configured to interfere with the flange 562 if the box insert is not oriented with the open end of box inlet properly aligned with the bracket 574. The fingers 576 also prevent rotation of the box insert when the box insert is seated in the frame insert 546.

While the embodiment of FIGS. 15-18 show a tank unit with both a sidewall inlet and a top wall grate inlet, it is recognized that some applications could utilize only the top wall grate inlet.

While certain, desired flow patterns are described with respect to various of the embodiments above, it is recognized that variations may occur. Accordingly, the claims provided below are not to be read as limited to any specific flow pattern unless expressly stated therein.

What is claimed is:

1. A separation system for separating particulate from liquid, the system comprising:
   a) a tank including an inlet for receiving liquid therein and an outlet for transferring liquid out of the tank;
   b) a storage chamber forming part of the tank, the storage chamber including a bottom and interior sidewalls, an inlet and an outlet;
   c) a bypass extending through the tank, wherein the bypass is arranged to receive liquid from the tank inlet, to transfer liquid into the storage chamber via the storage chamber inlet and to receive liquid from the storage chamber via the storage chamber outlet;
   d) a weir configured to direct liquid from the tank inlet to the storage chamber under relatively low flows and under relatively high flows to divert one portion of liquid from the tank inlet to the storage chamber and to allow another portion of liquid to flow directly through the bypass from the tank inlet to the tank outlet without entering the storage chamber;
   wherein liquid entering the storage chamber is directed to produce a rotational liquid flow, as viewed from the top, within the storage chamber, which rotational liquid flow progresses downwardly within the storage chamber along the periphery of the storage chamber, and a storage chamber outlet port opening is located centrally within the storage chamber and at an elevation that is at or below the bottom of the bypass, and wherein flow in a region of the storage chamber below the storage chamber outlet port opening is substantially unobstructed, and wherein flow into the storage chamber outlet port opening is upward and the storage chamber outlet port opening faces downward,
   wherein the bypass comprises an elongated U-shaped structure that is open at the top, ends of the U-shaped structure supported in respective U-shaped frames that are mounted to sidewalls of the tank.

2. The separation system of claim 1 wherein the elevation of the bottom of the bypass is X and the elevation of the storage chamber outlet port opening is between ½ X and X, wherein X is a distance measured from the bottom of the storage chamber.

3. The separation system of claim 2 wherein the elevation of the storage chamber outlet port opening is between ⅔ X and X.

4. The separation system of claim 1 wherein both a primary circulation pattern and a secondary meridional circulation pattern are created within the storage chamber, the secondary circulation pattern causes an upward flow of liquid in a central region of the storage chamber.

5. The separation system of claim 1 wherein the bypass is formed by a pipe, trough or other structure extending from the tank inlet to the tank outlet.

6. The separation system of claim 5 wherein the bypass extends substantially linearly across a diameter of the tank, the storage chamber is substantially cylindrical and the bottom is closed.

7. The separation system of claim 6 wherein storage chamber inlet includes an L-shaped drop pipe structure connected with the bypass, the storage chamber outlet comprises a linear drop pipe structure having the downwardly facing storage chamber outlet port opening at its lower end.

8. The separation system of claim 1 wherein the tank inlet is in a top wall of the tank.

9. The separation system of claim 8 wherein a flow directing structure is positioned in the top wall of the tank and includes an opening to direct incoming stormwater into the bypass on a side of the weir that includes the storage chamber inlet.

10. The separation system of claim 1 wherein the storage chamber inlet is formed in a lower wall of the bypass, and a storage chamber spillover inlet is provided in a sidewall of the bypass at a height lower than a top of the weir.

11. A separation system for separating particulate from liquid, the system comprising:
   a tank including an inlet for receiving liquid therein and an outlet for transferring liquid out of the tank, a storage chamber within the tank, water entering the tank is directed to produce a rotational liquid flow, as viewed from the top, within the storage chamber, which rotational liquid flow progresses downwardly within the storage chamber along the periphery of the storage chamber, and a downwardly facing storage chamber outlet port opening for a flow path leading from the storage chamber to the tank outlet is located centrally within the storage chamber and at an elevation that is at or below an invert of the outlet of the tank, and wherein flow into the storage chamber outlet port opening is in an upward direction;
   a bypass within the tank, the bypass receiving liquid from the tank inlet, a storage chamber inlet for delivering liquid from the bypass into the storage chamber, a storage chamber outlet for delivering liquid from the storage chamber back to the bypass, a weir positioned in the bypass between the storage chamber inlet and the storage chamber outlet, the storage chamber outlet port opening associated with the storage chamber outlet, wherein the bypass comprises an elongated U-shaped structure that is open at the top along a full length of the bypass and the U-shaped structure extends linearly across a diameter of the tank, ends of the U-shaped structure supported in respective U-shaped frames that are mounted to sidewalls of the tank.

12. The separation system of claim 11 wherein the storage chamber outlet port opening is located between ½ X and X, wherein X is a distance measured from the bottom of the storage chamber.

13. The separation system of claim 12 wherein the tank outlet is located in a tank sidewall that partially defines the storage chamber, liquid entering the storage chamber outlet port opening in the upward direction subsequently turns to exit the tank outlet.

14. The separation system of claim 13 wherein both a primary circulation pattern and a secondary circulation pattern are created within the storage chamber, the secondary meridional circulation pattern causes an upward flow of liquid in a central region of the storage chamber, the storage chamber is substantially a right circular cylinder shape with a substantially vertical axis and has a closed bottom.

15. The separation system of claim 14 wherein the tank inlet is in a top wall of the tank, a flow directing structure is positioned in the top wall of the tank and includes an opening to direct incoming stormwater into the bypass on a side of the weir that includes the storage chamber inlet.

16. A separation system for separating particulate from a liquid, the system comprising:
   a) a tank including an inlet for receiving the liquid therein and an outlet for transferring the liquid out of the tank;
   b) a storage chamber forming part of the tank, the storage chamber including a bottom and interior sidewalls, an inlet and an outlet;
   c) a bypass extending through the tank, wherein the bypass is arranged to receive the liquid from the tank inlet, to transfer the liquid into the storage chamber inlet and to receive the liquid from the storage chamber outlet, wherein the bypass comprises an elongated U-shaped structure that is open at the top along a full length of the bypass and the U-shaped structure extends linearly across a diameter of the tank, ends of the U-shaped structure supported in respective U-shaped frames that are mounted to sidewalls of the tank; and
   d) a weir positioned in the bypass between the storage chamber inlet and the storage chamber outlet, wherein the weir is configured to divert liquid from the tank inlet to the storage chamber under relatively low liquid flows, and under relatively high liquid flows to divert one portion of the liquid from the tank inlet to the storage chamber and to allow the remaining portion of the liquid to flow directly through the bypass from the tank inlet to the tank outlet;
   wherein the storage chamber inlet is formed by a tubular structure that extends downwardly from the bypass into the storage chamber and configured to produce a rotational liquid flow, as viewed from the top, within the storage chamber, and about a center axis of the storage chamber, including a radially outer and downward rotational flow and a radially inner and upward rotational flow;
   wherein the storage chamber outlet includes a tubular structure that extends downwardly from the bypass into the storage chamber and having a downwardly facing outlet port opening through which the center axis of the storage chamber extends, the downwardly facing outlet port opening receiving upward flow of liquid from the storage chamber; and
   and wherein flow in a region of the storage chamber below the downwardly facing outlet port is substantially unobstructed.

17. The system as claimed in claim 16 wherein the weir has a wall height such that its top exceeds the height of the top of the tank inlet.

18. A separation system for separating particulate from a liquid, the system comprising:
   a) a tank including an inlet for receiving the liquid therein and an outlet for transferring the liquid out of the tank;
   b) a storage chamber forming part of the tank, the storage chamber including a bottom and interior sidewalls defining a right circular cylinder shape with a substantially vertical center axis, an inlet and an outlet;
      wherein the storage chamber inlet is configured to produce a rotational liquid flow, as viewed from the top, within the storage chamber, and about the center axis of the storage chamber, including a radially outer and downward rotational flow and a radially inner and upward rotational flow; and
      wherein the storage chamber outlet includes a downwardly facing outlet port opening through which the center axis of the storage chamber extends, the downwardly facing outlet port opening receiving upward flow of liquid from the storage chamber;
   c) a bypass within the tank and extending linearly across the tank, the bypass receiving liquid from the tank inlet, the storage chamber inlet positioned for delivering liquid from the bypass into the storage chamber, the storage chamber outlet positioned for delivering liquid from the storage chamber back to the bypass, a weir positioned in the bypass between the storage chamber inlet and the storage chamber outlet, a storage chamber spillover inlet positioned along the bypass to allow floatables in the bypass to enter the storage chamber without having to travel through the storage chamber inlet and before such floatables pass over the weir toward the tank outlet, and a head equalization baffle positioned in the bypass between the storage chamber outlet and the tank outlet.

19. The system as claimed in claim 18 wherein the storage chamber inlet includes a first conduit connected to a second conduit, wherein the second conduit is angled with respect to the first conduit.

20. The system as claimed in claim 19 wherein the first conduit is arranged to be either (i) at or near perpendicular to a plane defined by the bottom of the storage chamber or (ii) at or near parallel to the plane defined by the bottom of the storage chamber.

21. A separation system for separating particulate from a liquid, the system comprising:
   a) a tank including an inlet for receiving the liquid therein and an outlet for transferring the liquid out of the tank;
   b) a storage chamber forming part of the tank, the storage chamber including a bottom and interior sidewalls, an inlet and an outlet;
   c) a bypass within the tank, the bypass receiving liquid from the tank inlet, the tank inlet delivering liquid to the bypass, the storage chamber inlet positioned for delivering liquid from the bypass into the storage chamber, the storage chamber outlet positioned for delivering liquid from the storage chamber back to the bypass, a weir positioned in the bypass between the storage chamber inlet and the storage chamber outlet, the storage chamber outlet includes a downwardly facing outlet port;
   wherein the bypass comprises an elongated U-shaped structure that is open at the top along a full length of the bypass and the U-shaped structure extends linearly across a diameter of the tank, ends of the U-shaped structure supported in respective U-shaped frames that are mounted to sidewalls of the tank.

* * * * *

UNITED STATES PATENT AND TRADEMARK OFFICE
CERTIFICATE OF CORRECTION

PATENT NO. : 8,746,463 B2  Page 1 of 1
APPLICATION NO. : 11/751209
DATED : June 10, 2014
INVENTOR(S) : Cobb et al.

It is certified that error appears in the above-identified patent and that said Letters Patent is hereby corrected as shown below:

In the Claims

Claim 7, Column 16, Line 1 reads:
"The separation system of claim 6 wherein storage cham-"
Should read -- The separation system of claim 5 wherein storage cham- --

Claim 13, Column 16, Line 51 reads:
"The separation system of claim 12 wherein the mark"
Should read -- The separation system of claim 11 wherein the mark --

Claim 14, Column 16, Line 56 reads:
"The separation system of claim 13 wherein both a"
Should read -- The separation system of claim 11 wherein both a --

Claim 15, Column 16, Line 63 reads:
"The separation system of claim 14 wherein the tank"
Should read -- The separation system of claim 11 wherein the tank --

Signed and Sealed this
Twenty-third Day of September, 2014

Michelle K. Lee
*Deputy Director of the United States Patent and Trademark Office*